A pipe comprises a pipe wall formed of a composite material of a matrix and a plurality of reinforcing fibers embedded within the matrix. At least one longitudinal portion of the pipe wall comprises or defines a local variation in construction to provide a variation in a property of the pipe.
36 Claims, 12 Drawing Sheets
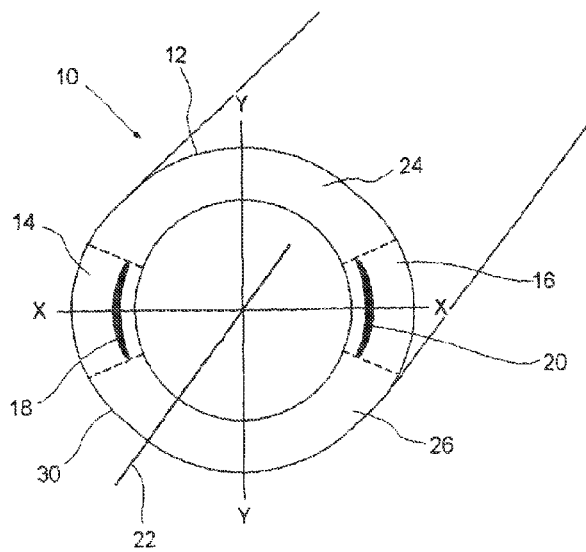

(51) Int. Cl.
*F16L 11/08* (2006.01)
*B29C 70/20* (2006.01)
*E21B 17/01* (2006.01)
*F16L 11/12* (2006.01)
*B29L 23/00* (2006.01)
*F16L 57/02* (2006.01)

(52) U.S. Cl.
CPC ......... *B29L 2023/005* (2013.01); *F16L 57/02* (2013.01)

(56) References Cited

U.S. PATENT DOCUMENTS

| | | | |
|---|---|---|---|
| 3,489,626 A * | 1/1970 | Rubenstein | 156/86 |
| RE27,061 E * | 2/1971 | Rubenstein | 156/86 |
| 3,565,119 A * | 2/1971 | Pierpont, Jr. | F16L 9/12 138/132 |
| 3,788,918 A | 1/1974 | Poulson | |
| 3,821,050 A | 6/1974 | Ambrose et al. | |
| 3,825,036 A * | 7/1974 | Stent | 138/174 |
| 3,886,980 A * | 6/1975 | Elson | 138/127 |
| 4,304,267 A * | 12/1981 | Campbell, Jr. | C04B 30/02 138/149 |
| 4,728,224 A * | 3/1988 | Salama | B63B 21/502 166/367 |
| 4,840,200 A * | 6/1989 | Creedon | 138/172 |
| 5,176,180 A * | 1/1993 | Williams et al. | 138/172 |
| 5,427,155 A * | 6/1995 | Williams | 138/103 |
| 5,469,916 A | 11/1995 | Sas-Jaworsky | |
| 5,638,870 A | 6/1997 | Takada et al. | |
| 5,828,003 A | 10/1998 | Thomeer et al. | |
| 5,908,049 A * | 6/1999 | Williams et al. | 138/125 |
| 6,109,834 A | 8/2000 | Chitwood | |
| 6,325,108 B1 * | 12/2001 | Bettinger | 138/153 |
| 6,641,904 B1 | 11/2003 | Jansen et al. | |
| 2002/0017333 A1* | 2/2002 | Wellman et al. | 138/146 |
| 2005/0100414 A1 | 5/2005 | Salama | |
| 2006/0197245 A1* | 9/2006 | Cheng et al. | 264/30 |
| 2006/0257604 A1 | 11/2006 | Anderson et al. | |
| 2009/0308478 A1 | 12/2009 | Vo | |
| 2012/0048416 A1* | 3/2012 | Hagen | E21B 43/086 138/140 |

FOREIGN PATENT DOCUMENTS

| | | |
|---|---|---|
| GB | 1098419 | 4/1965 |
| GB | 1493836 | 11/1977 |
| GB | 1516647 | 7/1978 |
| GB | 2274498 A | 7/1994 |
| GB | 2458996 A | 4/2008 |
| WO | 99/19653 A1 | 4/1999 |
| WO | 9967561 A1 | 12/1999 |

OTHER PUBLICATIONS

International Search Report and Written Opinion received in PCT application No. PCT/GB2011/001683 dated Jun. 8, 2012.
Examination Report received in corresponding Great Britain application No. GB1120914.5, dated Feb. 23, 2015, 4 pages.
Combined Search and Examination Report in counterpart UK Appl. GB1516486.6, dated Oct. 13, 2015.
Examination Report in counterpart EP Appl. 11804734.9, dated Sep. 29, 2015.

* cited by examiner

COMPOSITE PIPE

CROSS-REFERENCE TO RELATED APPLICATIONS

This application claims priority to PCT Patent Application No. PCT/GB2011/001683 filed on 5 Dec. 2011, which claims priority to United Kingdom Patent Application No. Great Britain 1020512.8 filed on 3 Dec. 2010, the contents of which are incorporated herein by reference.

BACKGROUND

Composite pipes are used in many industries, such as in the oil and gas industry for the confined transportation of fluids and equipment associated with hydrocarbon recovery from a subterranean reservoir. For example, composite marine risers, flow lines and jumpers are known in the art.

WO 99/67561 discloses a flexible composite pipe which is intended for use in transporting fluids such as hydrocarbons, and is formed from multiples coaxially aligned discrete layers which are bonded to each other. Specifically, the disclosed prior art pipe comprises separate inner and outer layers, and one or more discrete intermediate layers which include reinforcing fibres and which are disposed between the inner and outer liners.

SUMMARY

A pipe having a pipe wall may comprise a composite material formed of at least a matrix and a plurality of reinforcing fibres embedded within the matrix, wherein at least one circumferential segment of the pipe wall comprises or defines a local variation in construction to provide a local variation in a property of the pipe.

According to a first aspect of the present invention there is provided a pipe having a pipe wall comprising a composite material formed of at least a matrix and a plurality of reinforcing fibres embedded within the matrix, wherein in a plane which extends laterally through the pipe wall the matrix material defines a continuous circumferential structure and at least one circumferential segment of the pipe wall in said lateral plane comprises or defines a local variation in construction to provide a local variation in a property of the pipe.

One circumferential segment of the pipe wall may define a local variation in construction relative to a different circumferential segment to provide a local variation in a property of the pipe.

The matrix material defines a continuous circumferential structure such that the matrix does not include any discontinuities, such as windows or the like, which extend through the entire thickness of the pipe wall. As such, at least the matrix defines a complete structure around a bore of the pipe sufficient to provide, for example, fluid containment at least at the defined lateral plane.

The pipe wall may comprise at least two circumferential segments having different constructional properties.

The pipe wall may define a global construction around its circumference, wherein at least one circumferential segment comprises a local variation within this global construction.

Thus, the construction of the pipe wall includes one or more local variations around its circumference to achieve a local variation in a property of the pipe. That is, the constructional variation is sufficient to affect a variation in a property of the pipe.

In use, the local variation in a property of the pipe by virtue of the local constructional variation in at least one circumferential segment may establish a preferential characteristic in the pipe. Such a preferential characteristic may beneficially differ from that in a pipe of uniform circumferential construction. A preferential mechanical characteristic may be achieved, such as a strength, stiffness, flexural rigidity, bending, resonant characteristic or the like. A preferential thermal characteristic may be achieved, such as a thermal expansion characteristic, thermal insulation characteristic or the like.

The local constructional variation in at least one circumferential segment may establish a preferential characteristic affecting the pipe in a longitudinal direction. For example, the local constructional variation in at least one circumferential segment may establish a preferential longitudinal stiffness distribution or variation. Such a preferential longitudinal stiffness may permit a predetermined bending or flexing motion of the pipe to be achieved. Although discussed again and in further detail below, such predetermined bending may facilitate coiling of the pipe, desired compliance of the pipe during installation, controlled deformation during expansion and contraction of the pipe, controlling circumferential orientation of the pipe and the like.

The circumferential segment may extend between inner and outer surfaces of the pipe wall. An entire circumferential segment of the pipe wall may define a local variation in construction. A portion within at least one circumferential segment may define a local variation in construction. For example, at least one circumferential segment may comprise a local variation in construction at a location intermediate inner and outer surfaces of the pipe wall.

At least one circumferential segment may comprise a local variation in modulus of elasticity. At least one circumferential segment may comprise a local variation in second moment of area. At least one circumferential segment may comprise a local variation in coefficient of thermal expansion. At least one circumferential segment may comprise a local variation in thermal conductivity. At least one circumferential segment may comprise a local variation in a material strength, such as a yield strength of a particular component of the composite material. At least one circumferential segment may comprise a local variation in tensile strength. At least one circumferential segment may comprise a local variation in hoop strength. At least one circumferential segment may comprise a local variation in compressive strength. At least one circumferential segment may comprise a local variation in flexural strength.

The local constructional variation in at least one circumferential segment of the pipe wall may define a discrete constructional variation, for example with respect to an adjacent region or segment. For example, the local constructional variation may be provided in a step-wise or abrupt manner with respect to an adjacent region.

The local variation in at least one circumferential segment of the pipe wall may comprise a tapered or gradual variation, for example with respect to an adjacent region or segment.

At least one circumferential segment may comprise a local variation in the construction of the composite material, such as a constructional variation in one or both of the matrix material and the reinforcing fibres.

At least one circumferential segment may comprise a local variation in the type of matrix material. At least one circumferential segment may comprise a local variation in the volume of matrix material.

At least one circumferential segment may comprise a local variation in the distribution density of the reinforcing fibres within the matrix material. For example, the reinforcing fibres may be more densely packed together in at least a portion of one circumferential segment of the pipe wall than another circumferential segment. In such an arrangement the region of increased fibre packing density may define a region of modified stiffness, such as increased stiffness.

At least one circumferential segment may comprise a local variation in the type of fibre within the composite material. That is, at least a portion of one circumferential segment of the pipe wall may comprise a fibre type which is not present in another circumferential segment, or at least present in a different quantity or configuration. At least one circumferential segment may comprise one or more fibres with a modified, such as increased or decreased, stiffness, tensile strength, compressive strength or the like. At least one circumferential segment may comprise one or more reinforcing fibres with a modified dimension, such as a modified diameter. For example, at least a portion of one circumferential segment of the pipe wall may comprise fibres having a different diameter to those in a different circumferential segment.

At least one circumferential segment may comprise a local variation in fibre alignment angle within the composite material. That is, one or more reinforcing fibres in at least a portion of one circumferential segment may define a different alignment angle to one or more reinforcing fibres in a different circumferential segment. In this arrangement the fibre alignment angle may be defined relative to the longitudinal axis of the pipe. For example, a fibre provided at a 0 degree alignment angle will run entirely longitudinally of the pipe, and a fibre provided at a 90 degree alignment angle will run entirely circumferentially of the pipe, with fibres at intermediate fibre alignment angles running both circumferentially and longitudinally of the pipe, for example in a spiral pattern.

The local variation in fibre alignment angle may include fibres having an alignment angle of between, for example, 0 and 90 degrees, between 0 and 45 degrees or between 0 and 20 degrees.

In one arrangement at least one circumferential segment may comprise a local variation in fibre alignment angle in which one, or more preferably a plurality of fibres define an alignment angle of substantially 0 degrees.

At least one circumferential segment of the pipe wall may comprise a local variation in fibre pre-stress. In this arrangement the fibre pre-stress may be considered to be a pre-stress, such as a tensile pre-stress and/or compressive pre-stress applied to a fibre during manufacture of the pipe, and which pre-stress is at least partially or residually retained within the manufactured pipe. In this arrangement the fibre pre-stress in one circumferential segment of the pipe wall may differ from that in a different circumferential segment. In one arrangement the fibre pre-stress, such as pre-tension, in at least one circumferential segment of the pipe wall may be increased relative to a different circumferential segment. A local variation in fibre pre-stress may permit a desired characteristic of the pipe to be achieved, such as a desired bending characteristic. This may assist to position or manipulate the pipe, for example during installation, retrieval, coiling or the like. Further, this local variation in fibre pre-stress may assist to shift a neutral position of strain within the pipe wall, which may assist to provide more level strain distribution when the pipe is in use, and/or for example is stored, such as in a coiled configuration.

At least one circumferential segment may comprise a local variation in construction by use of at least one insert. The insert may be considered to be a separate component from the matrix and reinforcing fibres which form the composite material of the pipe wall. The insert may be formed separately and subsequently installed within at least one circumferential segment of the pipe wall. An insert may be installed within the pipe wall during manufacture of the pipe. An insert may be installed within the pipe wall following manufacture of the pipe.

Any insert may not extend through the entire thickness of the pipe wall, at least at the lateral plane, as such an arrangement would result in the matrix material becoming discontinuous.

The insert may define a structural insert. The insert may exhibit sufficient mechanical properties, such as stiffness, strength or the like, to provide a measurable effect on the mechanical properties of the entire pipe. For example, a single strand of a reinforcing fibre may not function as an insert due to the magnitude of difference between the structural properties of a single strand and the entire pipe. At least one insert may comprise an elongate insert. At least one insert may extend substantially longitudinally of the pipe. At least one insert may comprise a plate, rod, pin or the like. At least one insert may comprise a mesh structure or the like. At least one insert may comprise a metallic material, such as a metal alloy. At least one insert may comprise a shape memory metal alloy. At least one insert may comprise a non-metallic material. At least one insert may comprise a composite material, such as a composite of a matrix with embedded reinforcing fibres. In this arrangement a composite insert may be formed separately and subsequently installed or included in at least one circumferential segment of the pipe wall.

At least one circumferential segment may comprise a local variation in geometry. For example, at least one circumferential segment may define an increased or reduced wall thickness of the pipe wall.

At least one circumferential segment comprising a local constructional variation may extend longitudinally of the pipe. This arrangement may permit the local circumferential variation to desirably affect the pipe in a longitudinal direction.

At least one circumferential segment comprising a local constructional variation may extend longitudinally of the pipe parallel to the pipe axis. In this embodiment the circumferential location of at least one segment may be constant over a length of the pipe.

The location of at least one circumferential segment comprising a local constructional variation may extend both longitudinally and circumferentially of the pipe. In such an arrangement a local circumferential variation may extend in a spiral arrangement along a length of the pipe.

A local constructional variation in at least one circumferential segment of the pipe wall may remain constant along a length of the pipe. In this arrangement a common effect of the local constructional variation my be provided over a length of the pipe.

A local constructional variation in at least one circumferential segment of the pipe wall may vary along a length of the pipe. In this arrangement a variable effect of the constructional variation may be presented over a length of the pipe.

The local constructional variation in at least one circumferential segment may be selected to provide a desired longitudinal bending characteristic along the pipe. For example, the local constructional variation in at least one segment may be selected to provide longitudinal bending in a desired plane. This arrangement may permit a repeatable bending motion to be achieved, which may assist in coiling of the pipe, for example during deployment and retrieval, installation of the pipe or the like. This arrangement may also, or alternatively, permit multiple pipes according to the present aspect of the invention to be arranged in proximity to each other, wherein the local constructional variation in each pipe facilitates controlled longitudinal bending, for example in a preferred plane, which is adapted to prevent or substantially minimise interference between the pipes. This may be of concern where, for example, multiple pipes are bundled in a common location, extend along a common path or course, converge to a common restricted location from various directions or the like.

Such a desired longitudinal bending characteristic may be achieved by providing a local variation in stiffness within at least one circumferential segment of the pipe. In some embodiments a variation in stiffness, for example an increase in stiffness, within at least one circumferential segment may permit stresses within the pipe during longitudinal bending to be reduced.

The local constructional variation in at least one circumferential segment may be selected to provide a desired deformation characteristic, such as bending, buckling or the like, within the pipe when under load, such as when exposed to internal pressure, external pressure, torsional loading, radial loading, axial loading or the like. For example, the pipe may be formed to permit bending or deformation to be restricted to a particular direction or plane.

The local constructional variation in at least one circumferential segment may be selected to provide a desired longitudinal twist characteristic of the pipe. For example, the local constructional variation may permit the pipe to be deployed and retrieved, for example by coiling or spooling, while achieving a desired rotational orientation of the pipe. Such an arrangement may permit, for example, the pipe to adopt a desired orientation when deployed or retrieved, which may in turn permit supported equipment, for example, to also be deployed or retrieved in a desired orientation. Further, such control over the orientation of the pipe by virtue of a selected local constructional variation may facilitate more accurate measurement processes associated with the pipe, such as NDT testing, strain measurements and the like. In this respect, knowledge that the pipe will be orientated in a particular direction may assist in the positioning of measurement equipment, eliminate or minimise the requirement to separately determine the orientation of the pipe during measurement, or the like.

The local constructional variation in at least one circumferential segment may be selected to provide a desired thermal characteristic of the pipe.

The local constructional variation in at least one circumferential segment may be selected to provide a desired thermal expansion and/or contraction characteristic of the pipe. For example, a local constructional variation may be selected to permit the pipe to deform in a repeatable and expected manner upon thermal expansion thereof. This may, for example, permit controlled buckling of the pipe to be achieved during thermal expansion.

The local constructional variation in at least one circumferential segment may be selected to provide a desired thermal insulation characteristic of the pipe. For example, a variation in thermal conductivity within a circumferential segment of the pipe wall may permit a desired thermal insulation property to be achieved within said segment. This may be advantageous in circumstances where different circumferential segments of the pipe are exposed to different conditions when in use. For example, in one embodiment a portion of the pipe may be buried, for example in a seabed, and a portion may be exposed to an ambient environment, such as the sea. In such an exemplary arrangement the circumferential segment of the pipe which is exposed to the ambient environment may be locally modified to exhibit greater thermal insulation properties that that segment which is buried. This may permit the pipe to be more accurately formed for its intended use.

The local constructional variation in at least one circumferential segment may be selected to provide a desired thermal transmission characteristic of the pipe. This arrangement may, for example, permit heat, which may be provided from a heater, to be transmitted through the wall of the pipe. This may facilitate application in which an external heater is used to heat fluids within the pipe.

The pipe may comprise at least two circumferential pipe wall segments which each comprise a local variation in construction to provide a local variation in a property of the pipe. Each of the at least two circumferential segments of the pipe wall may comprise the same or different constructional variations.

The pipe may comprise two circumferential segments having a local constructional variation which are arranged substantially diametrically opposite each other. This arrangement may permit a desired property of the pipe to be achieved within or relative to a desired plane. In one arrangement the two segments may each comprise a local constructional variation to provide a local variation in stiffness longitudinally of the pipe. For example, each segment may define a region of increased stiffness such that the bending stiffness within the plane which includes both circumferential segments is increased. In such an arrangement the two circumferential segments with increased stiffness may define a neutral bending plane along which the pipe will bend. Accordingly, controlled bending orientation of the pipe may be achieved, which may assist in spooling, installation, during service or the like. Providing an effective increased stiffness along a bending plane may permit a reduction in the stresses developed within the regions of lower stiffness located at a distance from the neutral bending plane. This may therefore increase safety, and may, for example, permit a reduced permissible spooling diameter of the pipe to be achieved. It should be understood that a similar effect may be achieved by providing a local reduction in stiffness, such as axial stiffness, at two diametrically opposed circumferential segments.

The matrix of the composite material may define a continuous structure, wherein the reinforcing fibres are embedded within said continuous structure. In this arrangement the composite material may effectively be provided as a single layer throughout the thickness of the pipe wall, without any interfaces, such as bonded interfaces, between individual layers.

The distribution of the reinforcing fibres may vary throughout the continuous matrix in a radial direction through the pipe wall. The distribution of the reinforcing fibres may vary from zero at the region of the inner surface of the pipe wall, and be increased in a direction towards the outer wall. Accordingly, the region of the inner surface of the pipe wall will be absent of reinforcing fibres.

A radially inner region of the pipe wall may define a uniform construction, and a radially outer region of the pipe wall may comprise at least one circumferential segment which comprises or defines a local variation in construction. That is, the radially outer region may comprise at least two circumferential segments having a constructional variation therebetween. This arrangement may be achieved during manufacture of the pipe by providing a pre-formed pipe structure or mandrel of uniform construction and which defines the radially inner region of the pipe wall, and then forming the radially outer pipe wall region on the pre-formed mandrel, while including a variation in construction in one circumferential segment.

A method of manufacturing a pipe may comprise:

forming a pipe wall with a composite material comprising a matrix and a plurality of reinforcing fibres embedded within the matrix; and creating a local variation in the construction of the pipe wall within at least one circumferential segment of the pipe wall to provide a local variation in a property of the pipe.

According to a second aspect of the present invention there is provided a method of manufacturing a pipe, comprising:

forming a pipe wall with a composite material comprising a matrix and a plurality of reinforcing fibres embedded within the matrix, wherein the matrix material defines a continuous circumferential structure in a plane which extends laterally through the pipe wall; and in the same lateral plane creating a local variation in the construction of the pipe wall within at least one circumferential segment thereof.

The method may comprise forming a pipe in accordance with the first aspect. Features defined above in relation to the first aspect may also be associated with the second aspect.

A pipe may have a pipe wall comprising a composite material formed of at least a matrix and a plurality of reinforcing fibres embedded within the matrix, wherein the composite material in at least one region of the pipe wall is pre-stressed.

According to a third aspect of the present invention there is provided a pipe having a pipe wall comprising a composite material formed of at least a matrix and a plurality of reinforcing fibres embedded within the matrix, wherein the composite material comprises a varying level of pre-stress between different regions of the pipe wall.

Thus, in the third aspect the pipe may comprise a plurality of regions within the pipe wall, wherein a level of pre-stress within the composite material varies between at least two regions.

The composite material in at least one region of the pipe wall may comprise or define a level of pre-tension.

The composite material in at least one region of the pipe wall may comprise or define a level of pre-compression.

Pre-stress may be applied to the composite material within at least one region of the pipe wall during manufacture of the pipe. Such a pre-stress applied during manufacture may remain, at least residually, within the pipe wall region following manufacture.

Pre-stress within the composite material of at least one region of the pipe wall may be achieved by applying a tension to one or more of the reinforcing fibres of the composite material during manufacture of the pipe. Such applied tension may introduce a level of strain within one or more of the reinforcing fibres of the composite material during manufacture of the pipe. In one embodiment a 0.05 to 0.5% strain within one or more of the reinforcing fibres may be applied during manufacture of the pipe. A variable tension may be applied to one or more of the reinforcing fibres of the composite material during manufacture of the pipe.

Pre-stress may be achieved by applying a compression to one or more fibres during manufacture of the pipe.

In one embodiment a region of the pipe wall may be formed using an elongate composite tape, roving, tow or the like which is manipulated, for example wound, to form the pipe wall. In such an arrangement pre-stress may be applied within the elongate composite tape, roving, tow or the like during manufacture of the pipe. For example, a defined tension or compression may be applied to the elongate tape, roving, tow or the like during manufacture. A variable tension or compression may be applied to the elongate tape, roving, tow or the like during manufacture to establish different regions of the pipe wall with different levels of pre-stress.

Pre-stress within the composite material in at least one region of the pipe wall may be provided to achieve a desired stress and/or strain distribution within the pipe wall when the pipe is exposed to an anticipated condition.

Such an anticipated condition may be a condition when the pipe is in a service configuration, such as when exposed to internal and/or external fluid pressure and associated stresses and strains, such as hoop stresses/strains and the like. In such an arrangement the pre-stress within the composite material in at least one region of the pipe wall may be provided to achieve desired burst and/or collapse properties, such as strengths, of the pipe.

An anticipated condition may comprise a condition when the pipe is in a storage configuration, such as in a coiled storage configuration which may produce bending stresses/strains, axial tensile and compressive stresses/strains, torsional stresses/strains and the like. An anticipated condition may comprise a deployment configuration, such as the deployment from a reel, a retrieval configuration, such as retrieval onto a reel, or the like.

In one embodiment pre-stress within the composite material in at least one region may be provided to establish a desired stress and/or strain distribution within the pipe wall when the pipe is exposed to a particular or anticipated condition. Such a desired stress and/or strain distribution may include a more even or improved distribution throughout the pipe wall, for example when compared to a conventional composite pipe. Such a more even or improved stress and/or strain distribution may assist to minimise failure frequency, material fatigue, permit control or reduction in crack propagation, and the like. Further, such a more even or improved stress and/or strain distribution may permit higher strengths within the pipe wall to be achieved for given quantities of material.

Pre-stress within the composite material in at least one region of the pipe wall may be provided to achieve a desired movement bias of the pipe, such as a desired bending movement, buckling movement, elongation movement, radial expansion movement or the like.

The provision of a pre-stress within the composite material in at least one region may function to alter a neutral position of strain within the pipe wall.

The variation in pre-stress between different regions of the pipe wall may provide a desired global stress and/or strain distribution within the pipe wall when the pipe is exposed to a particular or anticipated condition, such as a service condition or the like. For example, the variation in pre-stress between the different regions may provide a more even or improved global stress and/or strain distribution within the pipe wall when exposed to a particular condition, such as a service condition or the like. A variation in the level of pre-stress between different regions of the pipe wall may permit a neutral position of strain within the pipe wall to be desirably affected, for example to accommodate a particular service condition or the like.

A variation in pre-stress within the composite material between different regions of the pipe wall may be provided in an abrupt or step-wise manner.

A variation in pre-stress within the composite material between different regions of the pipe wall may be provided in a gradual or tapered manner.

The pipe may comprise a plurality of regions within the pipe wall, wherein the composite material in at least one region may be pre-stressed, and the composite material in at least one other region may define or comprise substantially zero pre-stress. In such an arrangement a variation in composite material pre-stress between two different regions may vary from a neutral level of pre-stress.

A variation in pre-stress within the composite material between different regions may be provided by a combination of pre-tension and pre-compression within different regions.

A level of pre-stress present in the composite material in one region of the pipe wall may establish or influence the level of pre-stress created or provided in a different region of the pipe wall.

A pre-stress applied within the composite material of one region of the pipe wall may be selected to provide a particular pre-stress in a further region of the pipe wall. For example a degree of pre-stress in the form of tension applied in the composite material in one region of the pipe wall may provide a degree of pre-stress in the form of compression in the composite material in a different region of the pipe wall. Further, a degree of pre-stress in the form of tension applied in the composite material in one region of the pipe wall may provide a lower level of pre-tension in the composite material in a different region of the pipe wall.

The level of pre-stress within the composite material of the pipe wall may vary throughout the pipe wall in a radial direction. That is, the level of pre-stress within the composite material may vary throughout the thickness of the pipe wall. For example, the composite material in an outer region or layer of the pipe wall may comprise or define a different level of pre-stress than the composite material in an inner region or layer of the pipe wall. The outer region may entirely circumscribe the inner region.

The composite material in an outer region of the pipe wall may comprise or define a level of pre-tension, and the composite material in an inner region of the pipe wall may comprise or define a level of pre-compression. In this arrangement the pre-tension applied in the composite material of the outer region of the pipe wall may establish the pre-compression, or at least a portion of the pre-compression, within the composite material of the inner region of the pipe wall. For example, the pre-tension applied in the composite material of the outer region may apply a compressive hoop strain in the composite material within the inner region. This arrangement may be advantageous in applications where internal pipe pressures are dominant.

The composite material in an inner region of the pipe wall may comprise or define a level of pre-tension which is greater than that in an outer region of the pipe wall. This arrangement may be advantageous in applications where external pipe pressures are dominant.

A variation in pre-stress within the composite material in a radial direction of the pipe wall may be selected in accordance with one or more anticipated service conditions of the pipe. For example, a radial variation in hoop and/or axial pre-stress may be selected in accordance with one or more anticipated service conditions of the pipe. The provision of a variation in the pre-stress within the composite material in a radial direction of the pipe wall may, for example, be configured to accommodate stresses and/or strains applied to the pipe when exposed to internal and/or external pressures. Such accommodation of pressure applied stresses and strains may be in order to ensure a more even stress and/or strain distribution throughout the pipe wall.

For example, in an anticipated service condition in which internal pressures are dominant, for example when the product of the internal pressure and the inner radius of the pipe is higher than the product of the external pressure and the outer radius of the pipe, the resultant hoop stresses will be tensile. Accordingly, the composite material within an inner region will typically be exposed to a greater tensile strain than the outer region. As such, with increasing load as a result of increasing internal pressure, a failure strain level may be achieved first in the inner region. However, by provision of pre-tension in an outer region of the pipe wall which has the effect of applying a pre-compression within the composite material of the inner layer, the inner layer may be permitted or enabled to support a greater degree of strain before a failure strain limit is reached.

Conversely, in an anticipated service condition in which external pressures are dominant, the resultant hoop stresses will be compressive. The present invention may accommodate such a service condition by providing a greater degree of pre-tension in the composite material in the inner region of the pipe wall than in the outer region.

The level of pre-stress within the composite material of the pipe may vary throughout the pipe wall in a longitudinal direction. For example, the composite material in one longitudinal region of the pipe wall may comprise a different level of pre-stress from the composite material in a different longitudinal region of the pipe wall. Such an arrangement may be advantageous in circumstances where the pipe load requirements vary along the length of the pipe. For example, one longitudinal region of the pipe may be required to support a greater load, for example an axial load, than a different longitudinal region.

The level of pre-stress within the composite material of the pipe may vary throughout the pipe wall in a circumferential direction. For example, the composite material in one circumferential region or segment of the pipe wall may comprise a different level of pre-stress from the composite material in a different circumferential region or segment of the pipe wall. This arrangement may permit a variation in a property of the pipe in a circumferential direction to be achieved. Such an arrangement may permit a desired bending of the pipe, for example, to be achieved in a repeatable manner.

The modulus of the composite material may be varied throughout the pipe wall. The modulus of the composite material may be varied by varying the modulus of the matrix, for example by varying the type of matrix material. The modulus of the composite material may be varied by varying the modulus of one or more reinforcing fibres, for example by varying the type of reinforcing fibre.

The modulus of the composite material may be varied by varying the alignment angle of the reinforcing fibres. The fibre alignment angle may be defined relative to the longitudinal axis of the pipe. For example, a fibre provided at a 0 degree alignment angle will run entirely longitudinally of the pipe, and a fibre provided at a 90 degree alignment angle will run entirely circumferentially of the pipe, with fibres at intermediate fibre alignment angles running both circumferentially and longitudinally of the pipe, for example in a spiral pattern.

The modulus of the composite material may be varied in a radial direction within the pipe wall.

In one arrangement one or more fibres located within an outer region of the pipe wall may define a greater fibre alignment angle than one or more fibres located within an inner region of the pipe wall. For example, one or more fibres in an outer region of the pipe wall may define a fibre alignment angle in the region of 75 to 90 degrees, and one or more fibres in an inner region of the pipe wall may define a fibre alignment angle in the region of 65 to 80 degrees. In such an embodiment the inner fibres aligned at a lower alignment angle may be capable of accommodating higher hoop strains than the outer fibres aligned at a greater alignment angle. Such an arrangement may be advantageous in conditions where internal and/or external pressures are dominant.

In an alternative arrangement one or more fibres located within an inner region of the pipe wall may define a greater fibre alignment angle than one or more fibres located within an outer region of the pipe wall. Such an arrangement may be advantageous in combined load conditions, axial loading, bending moments, pressure loading or the like.

The matrix of the composite material may define a continuous structure, wherein the reinforcing fibres are embedded within said continuous structure. In this arrangement the composite material may effectively be provided as a single layer throughout the thickness of the pipe wall, without any interfaces, such as bonded interfaces, between individual layers.

The distribution of the reinforcing fibres may vary throughout the continuous matrix in a radial direction through the pipe wall. The distribution of the reinforcing fibres may vary from zero at the region of the inner surface of the pipe wall, and be increased in a direction towards the outer wall. Accordingly, the region of the inner surface of the pipe wall will be absent of reinforcing fibres.

A radially inner region of the pipe wall may define a uniform level of pre-stress, and a radially outer region of the pipe wall may define a varying level of pre-stress. That is, the radially outer region may comprise at least two sections having different levels of pre-stress. This arrangement may be achieved during manufacture of the pipe by providing a pre-formed pipe structure or mandrel of uniform pre-stress distribution and which defines the radially inner region of the pipe wall, and then forming the radially outer pipe wall region on the pre-formed mandrel, while including a variation in pre-stress in the radially outer region.

A method of manufacturing a pipe may comprise:

forming a pipe wall with a composite material comprising a matrix and a plurality of reinforcing fibres embedded within the matrix; and pre-stressing the composite material in at least one region of the pipe wall.

According to a fourth aspect of the present invention there is provided a method of manufacturing a pipe, comprising:

forming a pipe wall with a composite material comprising a matrix and a plurality of reinforcing fibres embedded within the matrix; and establishing a varying level of pre-stress in the composite material between different regions of the pipe wall.

The method may comprise forming a pipe in accordance with the third aspect. Features defined above in relation to the third aspect may also be associated with the fourth aspect.

According to a fifth aspect of the present invention there is provided a pipe having a pipe wall comprising a composite material formed of at least a matrix and a plurality of reinforcing fibres embedded within the matrix, wherein the modulus of the composite material varies throughout the pipe wall.

The modulus of the composite material may be varied by varying the modulus of the matrix, for example by varying the type of matrix material. The modulus of the composite material may be varied by varying the modulus of one or more reinforcing fibres, for example by varying the type of reinforcing fibre.

The modulus of the composite material may be varied by varying the alignment angle of the reinforcing fibres. The fibre alignment angle may be defined relative to the longitudinal axis of the pipe. For example, a fibre provided at a 0 degree alignment angle will run entirely longitudinally of the pipe, and a fibre provided at a 90 degree alignment angle will run entirely circumferentially of the pipe, with fibres at intermediate fibre alignment angles running both circumferentially and longitudinally of the pipe, for example in a spiral pattern.

The modulus of the composite material may be varied in a radial direction within the pipe wall.

In one arrangement one or more fibres located within an outer region of the pipe wall may define a greater fibre alignment angle than one or more fibres located within an inner region of the pipe wall. For example, one or more fibres in an outer region of the pipe wall may define a fibre alignment angle in the region of 75 to 90 degrees, and one or more fibres in an inner region of the pipe wall may define a fibre alignment angle in the region of 65 to 80 degrees. In such an embodiment the inner fibres aligned at a lower alignment angle may be capable of accommodating higher hoop strains than the outer fibres aligned at a greater alignment angle. Such an arrangement may be advantageous in conditions where internal and/or external pressures are dominant.

In an alternative arrangement one or more fibres located within an inner region of the pipe wall may define a greater fibre alignment angle than one or more fibres located within an outer region of the pipe wall. Such an arrangement may be advantageous in combined load conditions, axial loading, bending moments, pressure loading or the like.

A radially inner region of the pipe wall may define a uniform modulus, and a radially outer region of the pipe wall may define a varying modulus. That is, the radially outer region may comprise at least two sections having different moduli. This arrangement may be achieved during manufacture of the pipe by providing a pre-formed pipe structure or mandrel of uniform modulus and which defines the radially inner region of the pipe wall, and then forming the radially outer pipe wall region on the pre-formed mandrel, while including a variation in modulus in the radially outer region.

According to a sixth aspect of the present invention there is provided a method of manufacturing a pipe, comprising:

forming a pipe wall with a composite material comprising a matrix and a plurality of reinforcing fibres embedded within the matrix; and varying the modulus of the composite material throughout the pipe wall.

A pipe having a pipe wall may comprise a pipe having a pipe wall comprising a composite material formed of at least a matrix and a plurality of reinforcing fibres embedded within the matrix, wherein at least one longitudinal portion of the pipe wall comprises or defines a local variation in construction to provide a variation in a property of the pipe.

According to a seventh aspect of the present invention there is provided a pipe having a pipe wall comprising a composite material formed of at least a matrix and a plurality of reinforcing fibres embedded within the matrix, wherein the pipe wall comprises a local variation in construction in at least one longitudinal section such that the fibre construction in one longitudinal section of the pipe wall is different from the fibre construction of the composite material in a different longitudinal section.

Thus, the pipe comprises a variation in construction of the composite material along the length of the pipe. Such an arrangement may advantageously permit the pipe to be optimised, along its length, for a particular service condition, for example.

The variation in construction between the different longitudinal sections may be located at a common radial location within the pipe wall. Such a common radial location may be determined from a common datum point or surface, such as from an internal or external surface of the pipe.

The local variation in construction may be provided between at least two longitudinal sections on a common circumferential plane within the pipe wall.

The local constructional variation may be such that one longitudinal portion defines a different overall construction to that in a different longitudinal portion. In such an arrangement the pipe wall may comprise at least two longitudinal portions having different constructional properties.

Thus, the construction of the pipe wall includes one or more local variations along its length to achieve a variation in a property of the pipe. That is, the constructional variation is sufficient to affect a variation in a property of the pipe.

In use, the local variation in a property of the pipe by virtue of the local constructional variation may establish a preferential characteristic in the pipe. Such a preferential characteristic may beneficially differ from that in a pipe of uniform construction along its length, such as is known in the prior art. A preferential mechanical characteristic may be achieved, such as a strength, stiffness, flexural rigidity, bending, resonant characteristic, deformation characteristics, failure characteristics or the like. A preferential thermal characteristic may be achieved, such as a thermal expansion characteristic, thermal insulation characteristic or the like.

In embodiments of the present invention the preferential characteristic may be provided to more closely match the properties of the pipe to a desired service condition or environment. For example, in service conditions in which environmental effects differ over the length of the pipe, such as may be the case with a pipe extending through variable water depths, the provision of a longitudinal variation may permit the pipe to be more customised to the differing environmental properties. This may permit a reduction in material usage, costs, weight and the like. That is, conventional pipes are globally designed to accommodate the most extreme environmental conditions. However, the present invention permits variability to be incorporated within a pipe to permit customisation along its length.

The local constructional variation of the pipe wall may be configured to focus a particular behavioural characteristic at one or more longitudinal portions. This may permit a preferential control over the behaviour of the pipe to be achieved, which may assist when in a service condition, storage configuration, deployment/retrieval configuration or the like. For example, the local constructional variation may permit a controlled deformation to be achieved within a longitudinal portion of the pipe, and in some embodiments to be substantially restricted to said longitudinal portion. Such deformation may include buckling, longitudinal expansion and contraction, radial expansion and contraction, torsional deformation, bending or the like. Such deformation may include catastrophic failure, such as axial tensile failure, hoop tensile failure or the like. For example, a local constructional variation within the pipe may provide a portion of reduced strength, such as reduced tensile strength, reduced hoop strength or the like, which may focus any failure to occur within said longitudinal portion. In such an arrangement the specific longitudinal portion with reduced strength may be selected for ease of access, inspection, repair or the like. For example, in embodiments where the pipe is used in varying water depths, such as when used as a riser, for example a vertical riser, catenary riser or the like, a longitudinal portion of the pipe in proximity of the surface may comprise a local constructional variation to provide a region of minimum strength.

In some embodiments focusing a particular behavioural characteristic at a longitudinal portion of the pipe wall may permit multiple pipes according to the present aspect of the invention to be arranged in proximity to each other, wherein the local constructional variation in each pipe facilitates a desired behavioural characteristic, such as controlled longitudinal bending, at a common location. This may prevent or substantially minimise interference between the pipes, facilitate more compact installations and the like. This arrangement may be of application where, for example, multiple pipes are bundled in a common location, extend along a common path or course, converge to a common restricted location from various directions or the like, such as convergence towards a common floating vessel, for example a FPSO vessel used in the oil and gas industry.

At least one longitudinal portion may comprise a local variation in modulus of elasticity. At least one longitudinal portion may comprise a local variation in second moment of area. At least one longitudinal portion may comprise a local variation in coefficient of thermal expansion. At least one longitudinal portion may comprise a local variation in thermal conductivity. At least one longitudinal portion may comprise a local variation in a material strength, such as a yield strength of a particular component of the composite material. At least one longitudinal portion may comprise a local variation in tensile strength. At least one longitudinal portion may comprise a local variation in hoop strength. At least one longitudinal portion may comprise a local variation in compressive strength. At least one longitudinal portion may comprise a local variation in flexural strength. At least one longitudinal portion may comprise a local variation in geometry, such as wall thickness.

A local constructional variation may be provided in a plurality of longitudinal portions along the length of the pipe. For example along the complete length of the pipe.

The local constructional variation may define a discrete constructional variation in one longitudinal portion with respect to an adjacent longitudinal portion. For example, the local constructional variation may be provided in a step-wise or abrupt manner with respect to an adjacent portion.

The local constructional variation may comprise a tapered or gradual variation, for example with respect to an adjacent region. A gradual variation may be provided in one or more discrete longitudinal portions of the pipe. Alternatively, a gradual variation may be provided over the complete length of the pipe.

The local constructional variation may comprise a constructional variation in the matrix of the composite material such that matrix construction in one longitudinal section of the pipe wall is different from the matrix construction of the composite material in a different longitudinal section.

At least one longitudinal portion may comprise a local variation in the type of matrix material. At least one longitudinal portion may comprise a local variation in the volume of matrix material.

At least one longitudinal portion may comprise a local variation in the distribution density of the reinforcing fibres within the matrix material. For example, the reinforcing fibres may be more densely packed together in one longitudinal portion of the pipe wall than another longitudinal portion. In such an arrangement the region of increased fibre packing density may define a region of modified stiffness, such as increased stiffness, modified strength such as hoop strength, tensile strength or the like.

At least one longitudinal portion may comprise a local variation in the type of fibre within the composite material. That is, one longitudinal portion of the pipe wall may comprise a fibre type which is not present in another longitudinal portion, or at least present in a different quantity or configuration. At least one longitudinal portion may comprise one or more fibres with a modified, such as increased or decreased, stiffness, tensile strength or the like. At least one longitudinal portion may comprise one or more reinforcing fibres with a modified dimension, such as a modified diameter. For example, one longitudinal portion of the pipe wall may comprise fibres having a different diameter to those in a different longitudinal portion.

At least one longitudinal portion may comprise a local variation in fibre alignment angle within the composite material. For example, one or more reinforcing fibres in one longitudinal portion may define a different alignment angle to one or more reinforcing fibres in a different longitudinal portion, and/or one longitudinal portion may comprise a different proportion or quantity of fibres which define substantially the same alignment angle as those in another longitudinal portion. In this arrangement the fibre alignment angle may be defined relative to the longitudinal axis of the pipe. For example, a fibre provided at a 0 degree alignment angle will run entirely longitudinally of the pipe, and a fibre provided at a 90 degree alignment angle will run entirely circumferentially of the pipe, with fibres at intermediate fibre alignment angles running both circumferentially and longitudinally of the pipe, for example in a spiral pattern.

At least one longitudinal portion of the pipe wall may comprise a local variation in fibre pre-stress. In this arrangement the fibre pre-stress may be considered to be a pre-stress, such as a tensile pre-stress and/or compressive pre-stress applied to a fibre during manufacture of the pipe, and which pre-stress is at least partially or residually retained within the manufactured pipe. In this arrangement the fibre pre-stress in one longitudinal portion of the pipe wall may differ from that in a different longitudinal portion. In one arrangement the fibre pre-stress, such as pre-tension, in at least one longitudinal portion of the pipe wall may be increased relative to a different longitudinal portion. A local variation in fibre pre-stress may permit a desired characteristic of the pipe to be achieved, such as a desired bending characteristic. This may assist to position or manipulate the pipe, for example during installation, retrieval, coiling or the like. Further, this local variation in fibre pre-stress may assist to shift a neutral position of strain within the pipe wall, which may assist to provide more level strain distribution when the pipe is in use, and/or for example is stored, such as in a coiled configuration.

At least one longitudinal portion of the pipe wall may comprise a local variation in construction by use of at least one insert. The insert may be considered to be a separate component from the matrix and reinforcing fibres which form the composite material of the pipe wall. The insert may be formed separately and subsequently installed within at least one longitudinal portion of the pipe wall. An insert may be installed within the pipe wall during manufacture of the pipe. An insert may be installed within the pipe wall following manufacture of the pipe.

The insert may define a structural insert. The insert may exhibit sufficient mechanical properties, such as stiffness, strength or the like, to provide a measurable effect on the mechanical properties of the entire pipe. For example, a single strand of a reinforcing fibre may not function as an insert due to the magnitude of difference between the structural properties of a single strand and the entire pipe. At least one insert may comprise an elongate insert. At least one insert may extend substantially longitudinally of the pipe. At least one insert may comprise a plate, rod, cylinder pin or the like. At least one insert may comprise a mesh structure or the like. At least one insert may comprise a metallic material, such as a metal alloy. At least one insert may comprise a shape memory metal alloy. At least one insert may comprise a non-metallic material. At least one insert may comprise a composite material, such as a composite of a matrix with embedded reinforcing fibres. In this arrangement a composite insert may be formed separately and subsequently installed or included in at least one circumferential segment of the pipe wall.

The local constructional variation in the pipe wall may be selected to provide a desired longitudinal bending characteristic along the pipe. Such a desired longitudinal bending characteristic may be achieved by providing a local variation in stiffness within at least one longitudinal portion of the pipe. A modified stiffness may be achieved by, for example, modifying the modulus of the composite material, for example the matrix and/or the fibres, modifying the second moment of area, for example by providing more or less of the composite material, or the like. Such a local variation in stiffness may comprise a reduction in stiffness. This may permit or bias bending to occur at the longitudinal portion of the pipe comprising the reduced stiffness. Such a local variation in stiffness may comprise an increase in stiffness. This may minimise the level of permitted bending at this specific longitudinal portion. Such an increase in stiffness may be utilised in regions where loading or bending moments might be expected to be higher, for example at connections within other equipment, such as floating vessels, well head equipment or the like.

The local constructional variation in the pipe wall may be selected to provide a desired thermal expansion characteristic of the pipe. For example, a local constructional variation may be selected to permit the pipe to deform in a repeatable and expected manner upon thermal expansion thereof. This may, for example, permit controlled buckling, lateral deflection or the like of the pipe to be achieved during thermal expansion.

The local constructional variation in the pipe wall may be selected to provide a desired thermal insulation characteristic of the pipe. For example, a variation in thermal conductivity within a longitudinal portion of the pipe wall may permit a desired thermal insulation property to be achieved within said portion. This may be advantageous in circumstances where different longitudinal portions of the pipe are exposed to different conditions when in use. For example, in one embodiment a portion of the pipe may be buried, for example in a seabed, and a portion may be exposed to an ambient environment, such as the sea. In such an exemplary arrangement the longitudinal portion of the pipe which is exposed to the ambient environment may be locally modified to exhibit greater thermal insulation properties that that portion which is buried. This may permit the pipe to be more accurately formed for its intended use.

The local constructional variation in pipe wall may be selected to accommodate or absorb an anticipated movement, deformation or the like within the pipe, such as a longitudinal expansion movement or deformation. In such an arrangement the local constructional variation may be selected to provide a desired compression property or characteristic to permit axial expansion of the pipe to be accommodated within the associated longitudinal portion without any, or at least without any significant lateral deflection or deformation.

The local constructional variation in the pipe wall may be selected to provide a desired energy absorption characteristic of the pipe. For example, a local constructional variation may permit mechanical forces to be absorbed in the at least one longitudinal portion. In such an arrangement a longitudinal portion of the pipe may function as a damper. A constructional variation may permit vibration forces to be absorbed in the at least one longitudinal portion.

The local constructional variation in the pipe wall may be selected to provide a desired acoustic characteristic of the pipe. For example, the local variation may permit the pipe to permit the transmission of acoustic energy at the associated longitudinal portion. This may permit acoustic devices, such as transducers, to use the pipe wall at the associated longitudinal portion to couple acoustic energy into/from material contained therein. The local constructional variation may be selected to match the acoustic impedance of the pipe wall at the associated longitudinal portion with a material contained, or expected to be contained within the pipe. Such variations in acoustic properties may permit acoustic measurements to be made, such as may be made during flow metering measurements, fiscal monitoring or the like.

The local constructional variation in the pipe wall may be selected to provide a desired resonant characteristic of the pipe. For example, at least one longitudinal portion of the pipe may comprise a local variation configured to provide a desired resonant mode of vibration. This arrangement may permit vortex induced vibrations to be reduced or minimised within or on the pipe when exposed to an external flowing fluid which has a lateral component relative to the pipe. Specifically, the present invention may permit at least one longitudinal portion of the pipe to provide a resonant mode of vibration which differs from a vortex shedding frequency associated with the pipe and an anticipated service external flow condition.

The pipe may comprise or be associated with a measuring device located at one longitudinal portion of the pipe wall which comprises a local constructional variation. In this arrangement the local constructional variation may facilitate improved measurement. For example, the local constructional variation may be selected to permit focussing or exaggeration of movement in the longitudinal portion associated with the measuring device.

The pipe may comprise or define a continuous pipe wall. Accordingly, the constructional variation may not be provided by connecting two separate pipe sections together, and instead is provided by a local variation in construction within a single and continuous pipe wall.

The matrix of the composite material may define a continuous structure, wherein the reinforcing fibres are embedded within said continuous structure. In this arrangement the composite material may effectively be provided as a single layer throughout the thickness of the pipe wall, without any interfaces, such as bonded interfaces, between individual layers.

The distribution of the reinforcing fibres may vary throughout the continuous matrix in a radial direction through the pipe wall. The distribution of the reinforcing fibres may vary from zero at the region of the inner surface of the pipe wall, and be increased in a direction towards the outer wall. Accordingly, the region of the inner surface of the pipe wall will be absent of reinforcing fibres.

The matrix of the composite material may continuously extend between two longitudinal portions having variations in construction.

Continuous reinforcing fibres may extend between different longitudinal portions or regions of the pipe wall.

A radially inner region of the pipe wall may define a uniform construction along its length, and a radially outer region of the pipe wall may define a varying construction between different longitudinal portions. That is, the radially outer region may comprise at least two sections having different constructions. This arrangement may be achieved during manufacture of the pipe by providing a pre-formed pipe structure or mandrel of uniform longitudinal construction and which defines the radially inner region of the pipe wall, and then forming the radially outer pipe wall region on the pre-formed mandrel, while including a variation in construction between two different longitudinal regions.

A method of manufacturing a pipe may comprise:
forming a pipe wall with a composite material comprising a matrix and a plurality of reinforcing fibres embedded within the matrix; and
creating a local variation in the construction of the pipe wall within at least one longitudinal portion of the pipe wall to provide a variation in a property of the pipe.

According to a eighth aspect of the present invention there is provided a method of manufacturing a pipe, comprising:
forming a pipe wall with a composite material comprising a matrix and a plurality of reinforcing fibres embedded within the matrix; and
varying the fibre construction of the composite material in at least one longitudinal portion of the pipe wall such that the fibre construction in one longitudinal portion differs from the fibre construction in a different longitudinal portion.

The method may comprise forming a pipe in accordance with any other aspect. Features defined above in relation to any other aspect may also be associated with the present aspect.

A pipe having a pipe wall may comprise a composite material formed of at least a matrix and a plurality of reinforcing fibres embedded within the matrix, wherein the matrix defines a continuous structure and the fibres are variably distributed within the continuous matrix structure.

According to a ninth aspect of the present invention there is provided a pipe having a pipe wall comprising a composite material formed of at least a matrix and a plurality of reinforcing fibres embedded within the matrix, wherein the matrix defines a continuous structure and the fibres are variably distributed radially throughout the continuous matrix from zero at the region of the inner surface of the pipe wall, and be increased in a direction towards the outer wall.

Accordingly, the region of the inner surface of the pipe wall will be absent of reinforcing fibres.

In this arrangement the composite material may effectively be provided as a single layer throughout the thickness of the pipe wall, without any interfaces, such as bonded interfaces, between individual layers.

The matrix may define a continuous structure between inner and outer surfaces of the pipe wall.

A method of manufacturing a pipe may comprise forming a pipe wall with a continuous matrix material and variably distributing reinforcing fibres throughout the matrix material.

According to a tenth aspect of the present invention there is provided a method of manufacturing a pipe, comprising forming a pipe wall with a continuous matrix material and variably distributing reinforcing fibres radially throughout the continuous matrix from zero at the region of the inner surface of the pipe wall and increasing in a direction towards the outer wall.

According to an eleventh aspect of the present invention there is provided a pipe system, comprising:

a first pipe section having a wall comprising a metal material; and a second pipe section coupled to the first pipe section in end-to-end relation and having a wall comprising a composite material formed of at least a matrix and a plurality of reinforcing fibres embedded within the matrix, wherein the second pipe section is configured to sustain a greater level of strain than the first pipe section when the pipe system is subject to deformation by a load event.

The second pipe section may comprise a pipe according to any other aspect.

Accordingly, during deformation of the pipe system caused by a load event, a greater proportion of strain will be sustained by the second pipe section. This may assist in minimising the level of strain applied within the first pipe section, to the extent that a greater proportion of the strain induced within the pipe system during a load event will be sustained within the second pipe section. As such, the second pipe section may function to protect the first pipe section during a deformation and load event applied to the pipe system. For example, the second pipe section may be configured to prevent or substantially minimise the risk of strains and/or stresses being applied within the first pipe section which may cause yield limits of the metal material of said first pipe section to be exceeded. The second pipe section may be configured to minimise the risk of failure, material fatigue, adverse or undesired elastic or plastic deformation, or the like, of the first pipe section.

The pipe system may be configured such that a larger proportion of deformation within said system caused by a load event is focussed within the second pipe section. Accordingly, the second pipe section may be configured to accommodate a relatively greater proportion of deformation than the first pipe section. In embodiments of the present invention the second pipe section is configured to accommodate or absorb substantially all deformation of the pipe system during a load event.

The second pipe section may be configured to sustain a greater level of strain than the first pipe section when the pipe system is subject to deformation by a cyclical load event. Such a cyclical load event may be established during intermittent flow through the pipe system, during multi phase flow through the pipe system, during vortex shedding events when the pipe system is immersed in a flowing fluid, or the like.

The second pipe section may be configured to sustain a greater level of strain than the first pipe section when the pipe system is subject to deformation by an applied axial load. Accordingly, in this arrangement the second pipe section may be configured to accommodate a larger relative degree of axial expansion and/or contraction. In embodiments of the present invention, where an axial load is applied to the pipe system substantially all resulting axial deformation is absorbed by or restricted to the second pipe section.

The second pipe section may be configured to sustain a greater level of strain than the first pipe section when the pipe system is subject to deformation by an applied radial load.

The second pipe section may be configured to sustain a greater level of strain than the first pipe section when the pipe system is subject to deformation by a bending moment. Accordingly, in this arrangement the second pipe section may be configured to accommodate a larger relative degree of longitudinal bending. In embodiments of the present invention, where a bending moment is applied to the pipe system substantially all longitudinal bending is absorbed by or restricted to the second pipe section.

The second pipe section may be configured to sustain a greater level of strain than the first pipe section when the pipe system is subject to deformation by an applied torsional load. Accordingly, in this arrangement the second pipe section may be configured to accommodate a larger relative degree of twisting. In embodiments of the present invention, where a torsional load is applied to the pipe system substantially all resulting twisting deformation is absorbed by or restricted to the second pipe section.

A load event may be considered to be any event which applies a load or stress to or within the pipe system.

In one embodiment a load event may be established by thermal properties of the pipe system, for example thermal properties of one or both of the first and second pipe sections. A load event may be established by thermal expansion and/or contraction of the pipe system. In such an arrangement, deformation caused by thermal expansion and/or contraction may be accommodated, for example substantially entirely accommodated, by the second pipe section. For example, thermal expansion of one or both of the first and second pipe sections may generate a compressive axial load or stress within the pipe system. In such an arrangement or eventuality the second pipe section may be configured to sustain a greater level of compressive strain than the first pipe section. Further, thermal contraction of one or both of the first and second pipe sections may generate a tensile axial load or stress within the pipe system. In this arrangement or eventuality the second pipe section may be configured to sustain a greater level of tensile strain than the first pipe section.

A load event may be established by exposure of the pipe system to a service environment. For example external equipment or the like may engage the pipe system to generate an applied load. Further, an environmental condition may establish an applied load, such as internal or external fluid pressure, for example during submergence of the pipe system, fluid drag, vortex induced vibration, for example during submergence in a flowing fluid, or the like.

The second pipe section may define a greater resistance to one or more failure modes under load than the first pipe section. For example, the second pipe section may define a greater resistance to a buckling failure mode than the first pipe section. In such an arrangement the second pipe section may be configured to accommodate a greater degree of axial compressive loading or stress than the first pipe section prior to a buckling event. The second pipe section may be configured to accommodate a greater degree of axial compressive strain than the first pipe section prior to a buckling event. Accordingly, the second pipe section may sustain a greater level of strain than the first pipe section while retaining a substantially straight configuration.

The second pipe section may define a greater resistance to a tensile failure mode than the first pipe section.

The composite material of the second pipe section may be constructed to permit said pipe section to sustain a greater level of strain than the first pipe section when the pipe system is subject to deformation by an applied load. For example, the composite material may comprises desirable constructional properties, such as matrix type, fibre type, fibre alignment angle, composite material pre-stress, fibre packing density or the like.

The second pipe section may define a substantially straight pipe section. The substantially straight second pipe section may be configured to remain substantially straight during deformation of the pipe system caused by an axial load.

The second pipe section may be configured to be deformed laterally during deformation of the pipe system caused by an axial load. In such an arrangement deformation of the pipe system may be accommodated in a controlled manner by lateral deflection of the second pipe section.

The second pipe section may define a bent pipe section, wherein said bent pipe section may be configured to absorb deformation within the pipe system caused by an applied load. In such an arrangement, the composite material of the second pipe section may permit effects of cyclical loading to be minimised. For example, material fatigue is not of particular concern in composite material.

According to a twelfth aspect of the present invention there is provided a pipe system comprising:

a first pipe section having a wall comprising a metal material; and a second pipe section provided in accordance with any other aspect, wherein the second pipe section provides a local variation in a property of the pipe system along the length of the pipe system.

According to a thirteenth aspect of the present invention there is provided a method of manufacturing a pipe system, comprising:

providing a first pipe section having a wall comprising a metal material; and coupling a second pipe section in accordance with any other aspect to an end of the first pipe section, wherein the second pipe section provides a local variation in a property of the pipe system along the length of the pipe system.

According to a fourteenth aspect of the present invention there is provided a pipe having a pipe wall comprising a composite material formed of at least a matrix and a plurality of reinforcing fibres embedded within the matrix, wherein the construction of the composite material within the pipe wall is varied along the length of the pipe.

According to a fifteenth aspect of the present invention there is provided a pipeline or pipe system comprising:

a metallic pipe section having a wall comprising a metallic material; and a deformation absorber coupled to the metallic pipe section and comprising a composite pipe section having a wall comprising a composite material formed of at least a matrix and a plurality of reinforcing fibres embedded within the matrix, wherein the composite material is constructed to cause the deformation absorber to sustain a greater level of strain than the metallic pipe section when the pipeline is subject to deformation by a load event such that a larger proportion of deformation within the pipeline caused by a load event is focussed within the deformation absorber.

According to a sixteenth aspect of the present invention there is provided a pipe having a pipe wall comprising a composite material formed of at least a matrix and a plurality of reinforcing fibres embedded within the matrix, wherein a radially inner region of the pipe wall is of uniform construction and an outer region of the pipe wall is of varying construction.

The variation in construction in the outer region may comprise a variation in construction between different geometric portions of the outer region, such that the construction in one geometric portion differs from the construction in a different geometric portion. The variation in construction in the outer region may comprise a variation between different longitudinal portions, different radial portions and/or different circumferential portions.

The variation in construction may comprise or be defined by any variation in construction defined in relation to any other aspect.

The pipe may be manufactured by providing a pre-formed pipe structure or mandrel of uniform construction and which defines the radially inner region of the pipe wall, and then forming the radially outer pipe wall region on the pre-formed mandrel, while including one or more variations in construction therein.

According to a seventeenth aspect of the present invention there is provided a method of manufacturing a pipe having a pipe wall comprising a composite material formed of at least a matrix and a plurality of reinforcing fibres embedded within the matrix, the method comprising:

providing a pre-formed pipe structure or mandrel of uniform construction to define the radially inner region of a pipe wall; and forming a radially outer pipe wall region on the pre-formed mandrel, while including one or more variations in construction therein.

The pre-formed pipe structure may comprise both matrix and fibres. The pre-formed pipe structure may be free from fibres.

In one or more of the aspects defined above the matrix material may comprise a polymer. The matrix material may comprise a thermoplastic component. The matrix material may comprise a thermoset component. The matrix material may comprise a polyaryl ether ketone, a polyaryl ketone, a polyether ketone, a polyether ether ketone, a polycarbonate or the like, or any suitable combination thereof. The matrix material may comprise a resin, such as an epoxy resin or the like.

The reinforcing fibres may comprise continuous or elongate fibres. The reinforcing fibres may comprise any one or combination of carbon, glass, polymer, basalt, aramid fibres or the like. The reinforcing fibres may comprise discontinuous fibres.

In some embodiments the composite material may comprise a matrix and fibres formed of similar or identical materials. For example, a composite material may comprise one or more reinforcing fibres which are formed of the same material as the matrix, albeit in a fibrous, drawn, elongate form or the like.

In one or more of the aspects defined above the defined pipe may be configured for use above the ground. The pipe may be configured for use at least partially buried. The pipe may be configured for use in a subterranean environment. The pipe may be configured for use in a subsea location.

The pipe of any aspect may be rigid or quasi or substantially rigid. The pipe may be configured to define a minimum bending radius of at least 50 diameters. In some embodiments the pipe may be configured to define a minimum bend radius of at least 5 diameters, for example between 5 to 10 diameters.

The pipe may be configured for use as part of, for example, a riser, such as a vertical riser, catenary riser or the like, a flow line, a jumper or the like, or any combination thereof. The pipe may be configured for use in transporting a fluid, providing a confined conduit for tooling or the like, such as may be used in subterranean wellbore drilling operations, completion operations, intervention operations and the like.

The pipe may be configured for use in transporting product associated with the extraction of hydrocarbons from subsea reservoirs, including accommodating the flow of hydrocarbons, carbon dioxide, water, other chemicals, solid matter, fluid and gas mixes and the like.

The pipe may be configured for use in carbon dioxide or other gas sequestration.

The pipe in any aspect may define an oilfield pipe or tubular. Such an oilfield pipe or tubular may be one which is used for the conveyance of any fluid or any material or equipment associated with in the exploration, extraction, processing and transporting of hydrocarbon product.

Further aspects of the present invention may relate to methods of deploying and/or retrieving a pipe to/from a spool, such as a pipe according to any other aspect.

Further aspects of the present invention may relate to a pipe system comprising multiple pipes according to one or more previous aspects, which may be formed, for example by the incorporation of local constructional variations in the composite material, to accommodate proximity to each other.

Principles of the present invention defined in one or more of the aspects presented above may be applied to elongate solid bodies. That is, principles of the present invention defined in one or more of the aspects presented above may be applied to elongate bodies which do not include an internal bore. In such an arrangement the elongate body may define composite wireline, slickline or the like.

It should be understood that the features defined above in accordance with any aspect of the present invention may be utilised, either alone or in combination with any other defined feature, in any other aspect of the invention.

For example, an aspect of the present invention may relate to a pipe having a pipe wall comprising a composite material formed of at least a matrix and a plurality of reinforcing fibres embedded within the matrix, wherein the pipe wall comprises or defines at least one of:

a local constructional variation in at least one circumferential segment of the pipe wall;

pre-stress in at least one region of the pipe wall and a local constructional variation in at least one longitudinal portion of the pipe wall It should be understood that although terms such as "circumferential" and "radial" are used herein, these and similar terms are not intended to limit the pipe to being circular in cross-section. Instead, the pipe may be of any cross-sectional shape, such as oval, rectilinear or the like, and a circumferential segment may be considered to be a segment or sector of a perimeter of the pipe.

BRIEF DESCRIPTION OF THE DRAWINGS

These and other aspects of the present invention will now be described, by way of example only, with reference to the accompanying drawings, in which.

DETAILED DESCRIPTION

Figure 1:
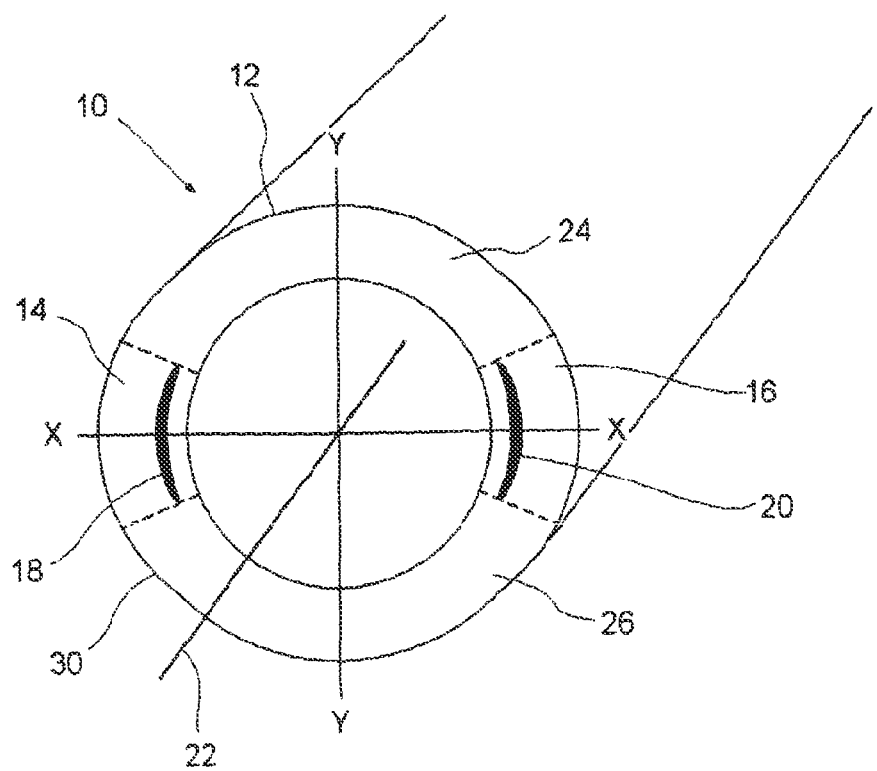
FIG. 1 is a lateral cross-sectional view of a pipe in accordance with an embodiment of one or more aspects the present invention.

A composite pipe, generally identified by reference numeral 10, in accordance with an embodiment of the present invention is shown in FIG. 1, wherein a lateral sectional view is provided to illustrate the exemplary structure of the pipe wall 12 across its thickness. The pipe may be suitable for use in a number of applications, such as in the recovery of hydrocarbons from a subterranean reservoir. For example, the pipe may be used as a riser, flow line, jumper, coiled tubing or the like.

The pipe wall 12 comprises a composite material formed of a matrix and a plurality of reinforcing fibres embedded within the matrix. The matrix and reinforcing fibres are not individually illustrated in FIG. 1 for clarity. The matrix material may comprise a polymer, such as a thermoplastic polymer, and in some embodiments the matrix may comprise polyether ether ketone (PEEK). The reinforcing fibres may comprise carbon fibres, glass fibres or the like.

In the embodiment shown the pipe wall 12 has a generally global and consistent construction provided by the composite material of matrix and embedded fibres. Further, the matrix of the composite material in the present embodiment defines a continuous circumferential structure. That is, no discontinuities extending through the entire wall thickness are present. However, the pipe wall 12 defines two diametrically opposed circumferential segments 14, 16 (identified in broken outline) which lie on the X-X plane and which each comprise a local variation in construction, identified by reference numerals 18 and 20. As will be described in further detail below, the local constructional variations 18, 20 in the respective segments 14, 16 are intended to provide local variations in a property of the pipe.

Figure 2:
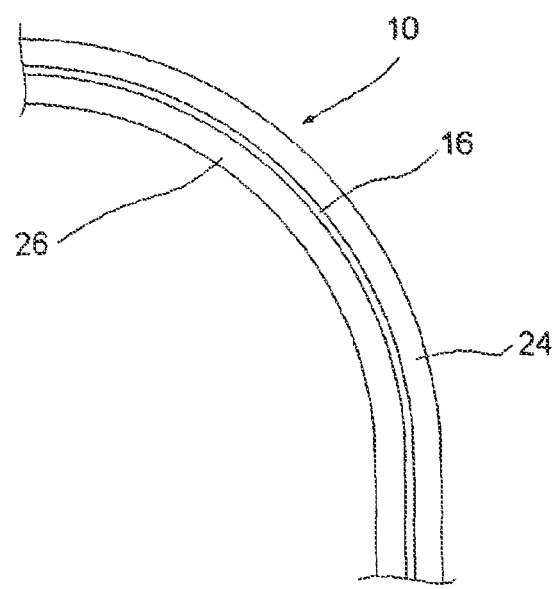
FIG. 2 is a side view of the pipe of FIG. 1, shown in a curved or bent configuration.

Although a number of possible constructional variations according to the present invention may be possible, in the present embodiment a local variation in fibre alignment angle is provided. Specifically, each local variation 18, 20 within its respective segment 14, 16 comprises a local variation in fibre alignment in which a number of fibres are arranged to extend longitudinally or axially of the pipe 10. More specifically, the individual fibres within the local constructional variations 18, 20 extend at 0 degrees relative to the central axis 22 of the pipe 10. This exemplary arrangement of each local variation 18, 20 has the effect of providing a local increase in axial stiffness within the segments 14, 16. As the segments 14, 16 are diametrically opposed, the local increase in stiffness results in an increase in pipe stiffness in the X-X plane. Accordingly, bending of the pipe 10 in a longitudinal direction will be encouraged to occur along the X-X plane, which will thus define a neutral plane of bending. This preferential longitudinal bending is demonstrated in FIG. 2. This ability to provide a repeatable bending form of the pipe may provide significant advantages, for example in terms of deployment, retrieval, commissioning, during use and the like. Such bending of the pipe 10 may occur in order to spool to pipe 10 to/from a reel (not shown). Further, such bending may occur when installing the pipe, for example to permit the pipe to be installed on a seabed from a floating vessel, to accommodate installation architecture and the like.

In the exemplary embodiment the upper and lower remaining segments 24, 26 will thus define regions of lower stiffness which lie at a distance from the neutral X-X plane. Accordingly, the material within the upper and lower segments will carry a highest proportion of strain throughout the pipe wall 12, but will, nevertheless, be exposed to a reduced stress level due to the effect of the higher stiffness in the circumferential segments 14, 16. As such, the exemplary embodiment in FIG. 1 may permit safety of the pipe to be increased, and permit a reduction in the permissible bend radius or spool diameter to be achieved. Further, the required material content may be reduced which may have an advantageous effect on costs, weight etc.

In some embodiments the pipe 10 may include local variations in a pretension applied within one or more reinforcing fibres within the pipe wall. In one example a number of fibres within the lower segment 26 may be provided within the matrix material at a higher tension than those in the upper segment 24. This may have the additional effect of encouraging bending in the manner illustrated in FIG. 2.

In the embodiment described above the local variation 18, 20 in each circumferential segment 14, 16 may be provided along the entire length of the pipe 10, such that the entire pipe includes a local property variation. However, in other examples only discrete longitudinal portions of the pipe 10 may include the local constructional variations 18, 20. This may be of application in regions of a pipe 10 which must incorporate a bend when installed. Furthermore, different longitudinal portions of the pipe 10 may include different constructional variations in different circumferential segments.

In the embodiment shown in FIG. 1, each local constructional variation 18, 20 is shown as being located within only a portion of the respective segments 14, 16, specifically intermediate the inner and outer walls 28, 30. However, in other embodiments a local variation may extend to one or both of the inner and outer walls 28, 30.

As described above, an exemplary embodiment of the present invention includes local variations in axial stiffness provided by a local variation in fibre alignment. However, in other embodiments a stiffness variation may be achieved by use of a different type of fibre. For example, the pipe wall 12 may largely comprise T300 (230 GPa) carbon fibre within the composite material, whereas the circumferential segments 14, 16 may comprise M40j (377 GPa) carbon fibre. Further, the pipe wall 12 may largely comprise fibres of Eglass within the composite material, whereas the circumferential segments 14, 16 may comprise T300 (230 GPa) carbon fibre.

Further, a stiffness variation may be achieved by use of a different density of fibres within segments 14, 16, use of a different matrix material, variation in geometry, such as cross-sectional shape, wall thickness, or the like.

Also, each segment 14, 16 may be configured to define or comprise a local variation in a property in addition to, or alternatively to, stiffness. For example, one or more segments may comprise a local variation in a thermal coefficient, such as a coefficient of thermal expansion. In such an alternative embodiment a segment with a differing coefficient of thermal expansion may encourage a particular deformation of the pipe when thermal expansion occurs.

Furthermore, one or more circumferential segments within the pipe may be configured to comprise or define a local variation in strength. In one alternative or supplemental embodiment, one or more circumferential segments may comprise or define a local increase in tensile strength. Such a local increase in tensile strength throughout individual segments of the circumference of the pipe, as opposed to the entire circumference, may permit the pipe to support a larger global tension while permit a reduction in material usage, costs and the like.

As described above, in the embodiment shown in FIG. 1 each local constructional variation 18, 20 is provided by a constructional variation in the composite material which forms the pipe wall 12. However, in other embodiments one or more constructional variations may be provided by an insert, such as a metal insert, separate composite insert or the like.

Figure 3:
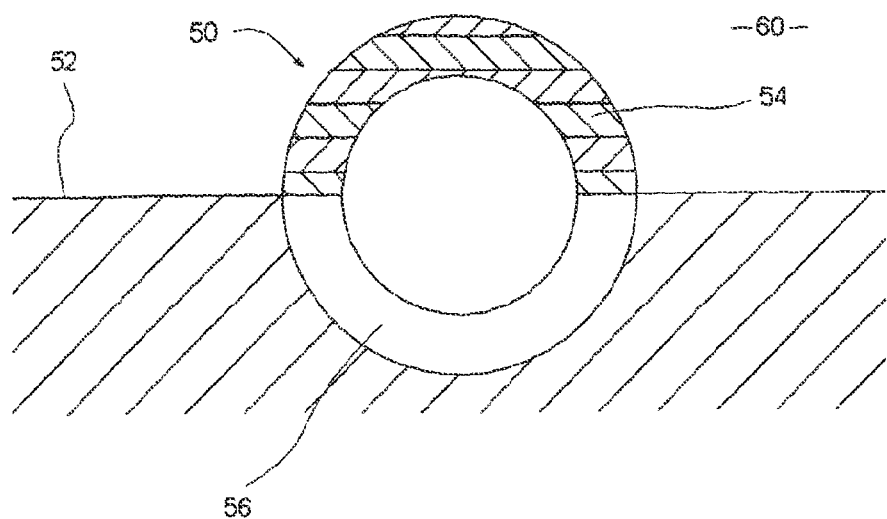
FIG. 3 is a diagrammatic illustration of a pipe in accordance with an alternative embodiment of one or more aspects of the present invention.

An alternative embodiment of a pipe, generally identified by reference numeral 50, is shown in FIG. 3, wherein the pipe 50 is shown in lateral cross-section and partially embedded within a seabed 52. In this embodiment an upper circumferential segment 54 comprises a variation in construction, relative to a lower segment 56, which provides a local decrease in thermal conductivity. As such, the portion of the pipe 50 which will, in use, be exposed to a sea environment 60 will exhibit a greater degree of thermal insulation, which would not be required in that portion of the pipe which is buried within the seabed 52. This particular embodiment of the invention may also incorporate circumferential segments which include local variations in stiffness, such as provided in the embodiment of FIG. 1, to ensure that the illustrated orientation of the pipe 50 is ensured during deployment and installation.

Figure 4:
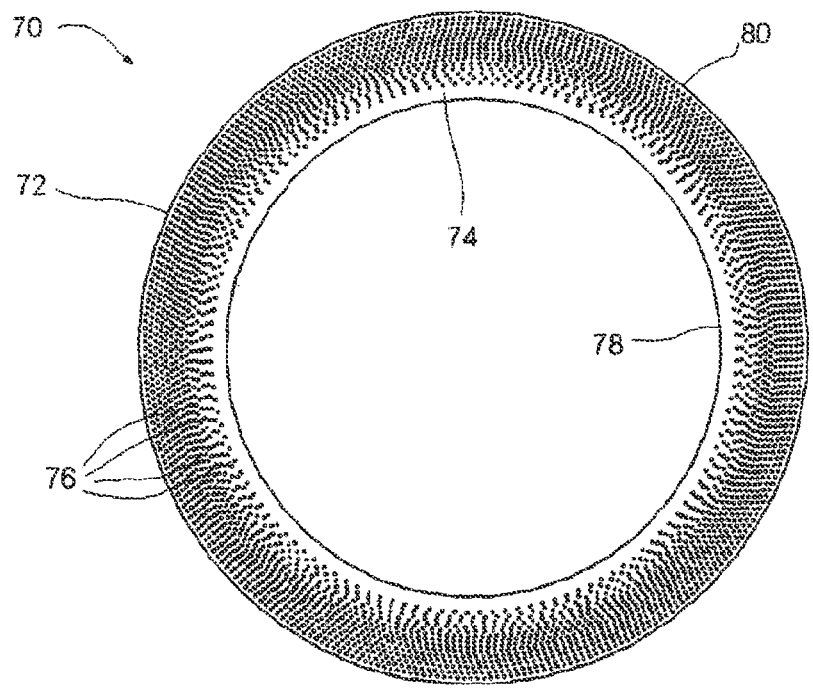
FIG. 4 is a lateral cross-sectional view of a composite pipe demonstrating a composition of a matrix material and embedded reinforcing fibres which forms the pipe wall.

A lateral cross-sectional view of a pipe, generally identified by reference numeral 70, in accordance with an embodiment of the present invention is shown in FIG. 4. The pipe 70 comprises a pipe wall 72 which is formed of a composite of a matrix material 74 and a plurality of reinforcing fibres 76 embedded within the matrix 74. The matrix material 74 defines a continuous structure, such that no interfaces, such as bonding interfaces, are presented throughout the radial extent of the pipe wall 72. This arrangement permits a more robust structure to be provided, without risk of introducing internal weakness, stress raisers and the like by separate interface regions. Further, the elimination of interfaces within the pipe wall may minimise the risk of gas pockets forming within the pipe wall at such interfaces, which may otherwise lead to adverse effects, for example during pressure cycles. The fibres 76 are variably distributed throughout the pipe wall thickness between an inner pipe surface 78 and an outer pipe surface 80. The variable distribution is such that no fibres 76 are provided in the region adjacent the inner pipe surface 78. This arrangement may permit the inner surface region of the pipe 70 to remain entirely fluid tight, without any possible introduction of permeability by the presence of fibres.

The arrangement shown in FIG. 4 may also incorporate one or more local constructional variations, for example in one or more circumferential segments such as described above, and/or in one or more longitudinal portions such as defined later below, and/or with a varying degree of pre-stress such as defined immediately below.

Figure 5:
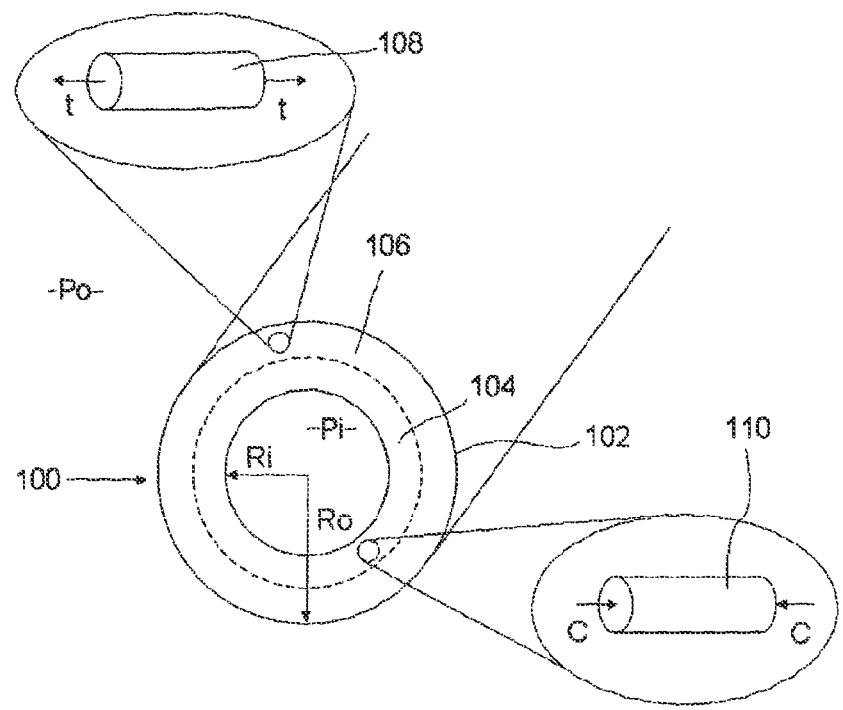
FIG. 5 is a diagrammatic illustration of a composite pipe in accordance with an embodiment of one or more aspects of the present invention.

A composite pipe, generally identified by reference numeral 100, in accordance with an embodiment of the present invention is shown in FIG. 5, wherein a lateral sectional view is provided to illustrate the exemplary structure of the pipe wall 102 throughout its thickness. The pipe 100 may be suitable for use in a number of applications, such as in the recovery of hydrocarbons from a subterranean reservoir. For example, the pipe 100 may be used as a riser, flow line, jumper, coiled tubing or the like, and may be locatable in a subsea location. As such, in embodiments of the present invention the pipe may be specifically designed to accommodate both internal and external pressures, as will be discussed in more detail below.

The pipe wall 102 comprises a composite material formed of a matrix and a plurality of reinforcing fibres embedded within the matrix. The matrix and reinforcing fibres are not individually illustrated in FIG. 5 for clarity. The matrix material may comprise a polymer, such as a thermoplastic polymer, and in some embodiments the matrix may comprise polyether ether ketone (PEEK). The reinforcing fibres may comprise carbon fibres, glass fibres or the like.

One principal feature of the present invention shown in the exemplary embodiment of FIG. 5 is the application of a pre-stress within the composite material forming the pipe wall 102, and in the present embodiment the pre-stress within the composite material is provided largely by applying a pre-stress to the reinforcing fibres of the composite material during manufacture of the pipe. More specifically, the pipe wall 102 is formed using elongate reinforcing fibres within a tape, rovings, tows or the like, wherein the tape, rovings, tows or the like is/are manipulated, for example wound, to form the pipe wall 102, with pre-stress being applied within the fibres during this manipulation. This pre-stress may be pre-tension and/or pre-compression. As will be described in detail below, the pre-stress within the composite material of the pipe wall 102 is provided to achieve a desired stress and/or strain distribution within the pipe wall 102 when the pipe 100 is exposed to an anticipated condition, such as an anticipated service condition.

In the embodiment shown in FIG. 5 the pipe wall 102 defines at least two regions, specifically an inner region 104 and an outer region 106, wherein the outer region 106 entirely circumscribes the inner region 104. A level of pre-tension is applied to the composite material within the outer region 106, as demonstrated by the enlarged view of a fibre 108 which is shown to carry a tension t. In this embodiment the pre-tension t applied in the outer layer 106 is sufficient to establish a compressive hoop strain in the composite material within the inner region 104, as demonstrated by the enlarged view of a fibre 110 which is shown under a compression C. Thus, the pipe wall 102 is formed to define or comprise a varying pre-stress throughout the composite material, which has the effect of providing an even global stress and/or strain distribution within the pipe wall 102 when exposed to an anticipated service condition. Further, the variation in the level of pre-stress between the different regions 104, 106 permits a neutral position of strain within the pipe wall 102 to be desirably affected, for example to accommodate a particular service condition or the like.

More specifically, the embodiment shown in FIG. 5 may be arranged for use in a service condition in which the internal pipe pressure is dominant, that is, in a service condition in which the product of the inner pressure Pi and the inner radius Ri is greater than the product of the outer or external pressure Po and the outer radius Ro (i.e., PiRi>PoRo). In such a service condition the composite material within the inner region 104 will typically be exposed to a greater tensile strain than the composite material in the outer region 106. As such, with increasing load as a result of increasing internal pressure Pi, a failure strain level may be achieved first in the inner region 104. However, by provision of pre-tension t in the outer region 106 which has the effect of applying pre-compression C within the composite material of the inner layer 104, the inner layer may be permitted or enabled to support a greater degree of strain before a failure strain limit is reached.

Figure 6:
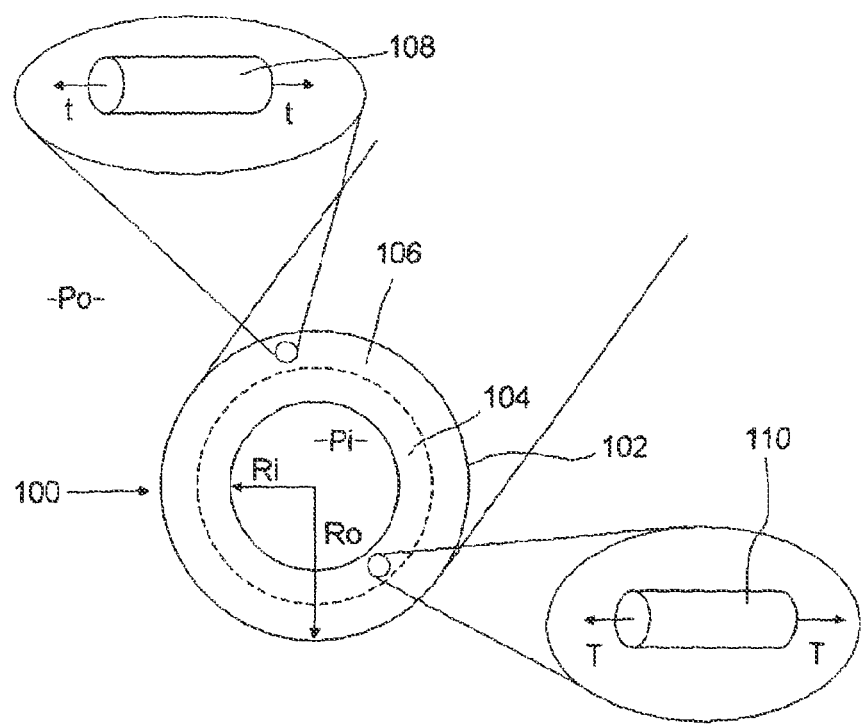
FIG. 6 is a diagrammatic illustration of a composite pipe in accordance with an alternative embodiment of one or more aspects of the present invention.

An alternative arrangement is shown in FIG. 6 which is configured for use in a service condition in which external pressures are dominant (i.e., PiRi<PoRo) and the resultant hoop stresses will be compressive. The pipe shown in FIG. 6 is largely similar to that in FIG. 5 and as such common reference numerals have been used. Accordingly, the pipe 100 comprises a pipe wall 102 which includes inner and outer regions or layers 104, 106. However, in the present embodiment in FIG. 6, the composite material of the inner layer 104 includes a greater pre-tension than the composite material in the outer layer 106. This is demonstrated by a fibre 110 of the inner layer 104 being under a pre-tension T which is greater than a pre-tension t applied to a fibre 108 in the outer layer 106 (i.e., T>t).

In alternative embodiments the effects of dominant internal and/or external pressures may be accommodated alternatively, or additionally, by providing a variation in the modulus of the composite material throughout the pipe wall. Such a variation in modulus may be achieved by varying the matrix type, varying the fibre type, varying the fibre alignment angle or the like. The fibre alignment angle may be defined relative to the longitudinal axis of the pipe. For example, a fibre provided at a 0 degree alignment angle will run entirely longitudinally of the pipe, and a fibre provided at a 90 degree alignment angle will run entirely circumferentially of the pipe, with fibres at intermediate fibre alignment angles running both circumferentially and longitudinally of the pipe, for example in a spiral pattern.

In one specific example, which may be adapted for service conditions in which internal pressures are dominant and as such is described again with reference to FIG. 5, the fibres in the outer layer 106 define a greater alignment angle than those in the inner layer 104. For example, the fibres in the outer layer 106 may define a fibre angle in the region of 85 degrees, and the fibres in the inner layer 104 may define a fibre angle in the region of 75 degrees. As such, the fibres in the inner layer 104 may be capable of accommodating higher hoop strains.

In another specific example, the fibres in the outer layer 106 may define a lower alignment angle than those in the inner layer 104.

In other embodiments of the present invention a variation in pre-stress, and optionally also composite modulus, may be provided in other directions within the pipe other than radially.

Figure 7:
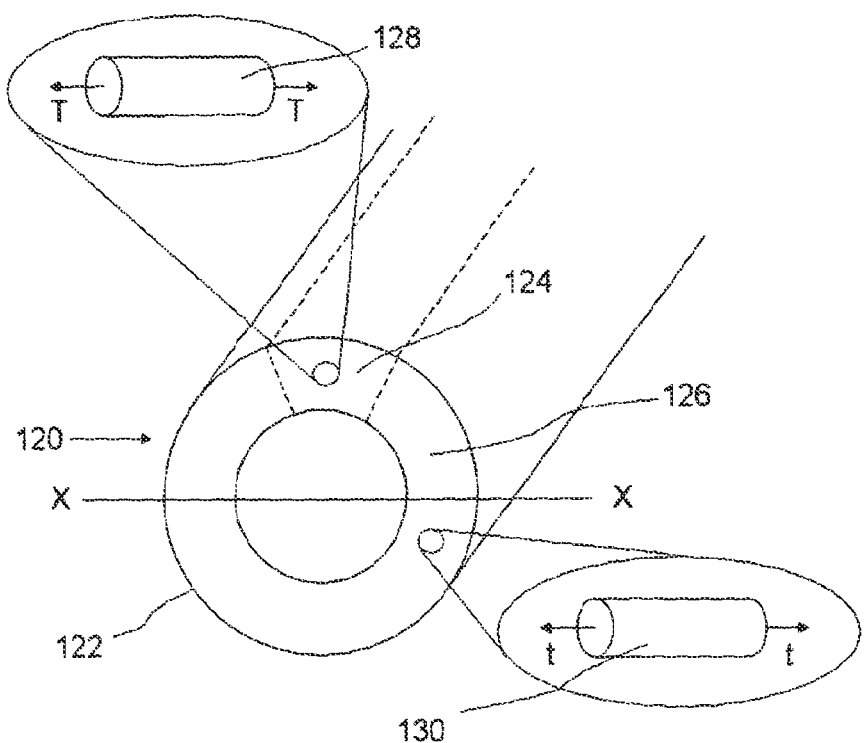
FIG. 7 is a diagrammatic illustration of a composite pipe in accordance with another alternative embodiment of one or more aspects the present invention.

For example, in the embodiment shown in FIG. 7 a pipe 120 comprises a pipe wall 122 which is formed of a composite material which has or defines a pre-stress which varies circumferentially of the pipe. For example, a level of pre-stress in one circumferential segment 124 of the pipe wall 122 differs from that in another circumferential segment 126. In the specific example shown fibres 128 in segment 124 are provided with a greater pre-tension T than fibres 130 in segment 126 (i.e., T>t). This particular embodiment may permit a preferential bias to be introduced into the pipe, such as permitting the pipe to preferentially bend about horizontal plane X-X.

Figure 8:
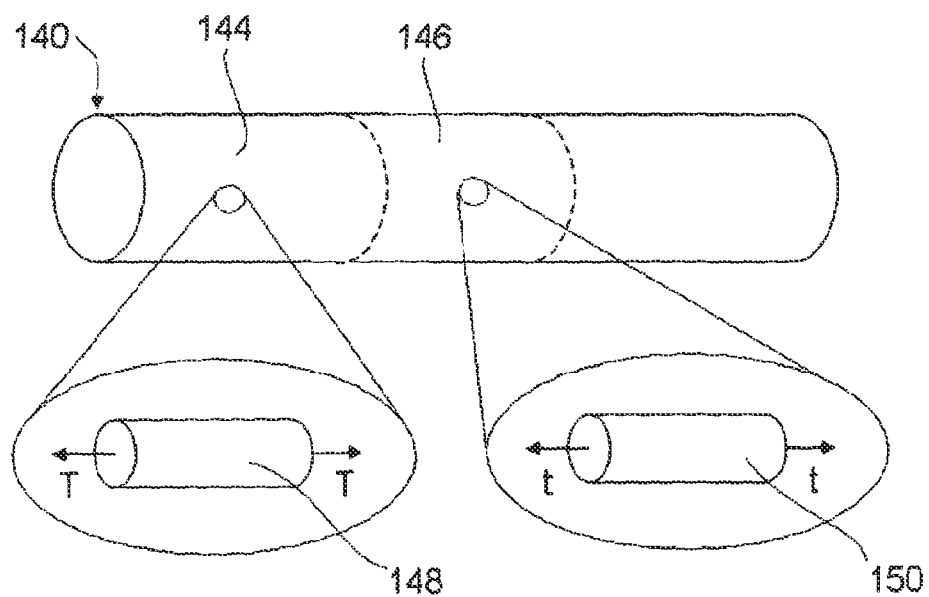
FIG. 8 is a diagrammatic illustration of a pipe in accordance with a further alternative embodiment of one or more aspects the present invention.

In a further example, as demonstrated in FIG. 8, a pipe 140 is formed of a composite material which has or defines a pre-stress which varies longitudinally of the pipe. For example, a level of pre-stress in one longitudinal portion 144 of the pipe may differ from that in another longitudinal portion 146. In the specific example shown fibres 148 in portion 144 are provided with a greater pre-tension T than fibres 150 in portion 146 (i.e., T>t). This particular embodiment may permit a particular region of the pipe 140 to define higher hoop or burst strengths, for example. Further, this particular embodiment may permit longitudinal bending, elongation, twisting or the like of the pipe 140 to be focussed in a particular portion, such as in portion 146. Further, the longitudinal variation in pre-stress may be provided to create a focussed and specific weak point within the pipe. In such an arrangement if failure of the pipe might occur, such as due to extreme events, such failure may be restricted to a particular region, facilitating ease of inspection, repair and the like.

The different pre-stress arrangements defined above, and their different variations, may be provided individually or with some in combination.

Figure 9:
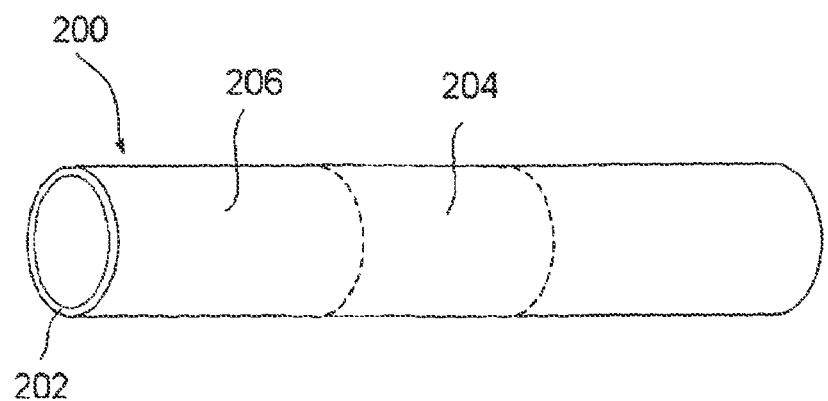
FIG. 9 is a diagrammatic illustration of a pipe in accordance with a general embodiment of one or more aspects of the present invention, wherein the pipe includes a local constructional variation in a longitudinal portion thereof.

A generalised embodiment of a composite pipe is shown in FIG. 9, wherein the pipe is identified by reference numeral 200. The pipe may be suitable for use in a number of applications, such as in the recovery of hydrocarbons from a subterranean reservoir. For example, the pipe may be used as a riser, flow line, jumper, coiled tubing or the like.

The wall 202 of the pipe 200 comprises a composite material formed of a matrix and a plurality of reinforcing fibres embedded within the matrix. The matrix and reinforcing fibres are not individually illustrated in FIG. 9 for clarity. The matrix material may comprise a polymer, such as a thermoplastic polymer, and in some embodiments the matrix may comprise polyether ether ketone (PEEK). The reinforcing fibres may comprise carbon fibres, glass fibres or the like.

In the embodiment shown the pipe wall 202 comprises a longitudinal portion 204, delimited by broken outline, which comprises or defines a local variation in the construction of the composite material. That is, the construction of the composite material in the longitudinal portion 204 differs to that in a further longitudinal portion, such as adjacent longitudinal portion 206. Although a step-wise variation between the longitudinal portions 204, 206 is illustrated by the broken lines, in embodiments of the invention a tapering variation may be provided. In fact, in some embodiments, as will be described in further detail below, a tapering variation may be provided across the whole length of a composite pipe.

Although discussed in further detail below, the local constructional variation in the longitudinal portion 204 is provided to establish a variation in a property within the pipe 200 which may in turn establish a preferential characteristic in the pipe 200. A preferential mechanical characteristic may be achieved, such as a strength, stiffness, flexural rigidity, bending, resonant characteristic, deformation characteristics, failure characteristics or the like. A preferential thermal characteristic may be achieved, such as a thermal expansion characteristic, thermal insulation characteristic or the like. The local constructional variation of the pipe wall 202 in the longitudinal portion 204 may be configured to focus a particular behavioural characteristic at said longitudinal portion 204. For example, the local constructional variation may permit a controlled deformation to be achieved within said longitudinal portion 204, and in some embodiments to be substantially restricted to said longitudinal portion 204. Such deformation may include buckling, longitudinal expansion and contraction, radial expansion and contraction, torsional deformation, bending or the like. Such deformation may include catastrophic failure, such as axial tensile failure, hoop tensile failure or the like.

A number of possible constructional variations according to the present invention may be possible, such as a local variation in modulus of elasticity, a local variation in second moment of area, a local variation in coefficient of thermal expansion, a local variation in thermal conductivity, a local variation in material strength, a local variation in tensile strength, a local variation in hoop strength, a local variation in geometry, such as wall thickness, a local variation in fibre alignment angle, a local variation in fibre type, a local variation in matrix type, a local variation in fibre density, a local variation in composite material pre-stress (for example as defined with reference to FIG. 8), or the like.

Although many different combinations of local variations and uses are possible within the scope of the present invention, some have been described in detail below for exemplary purposes only.

Figure 10:
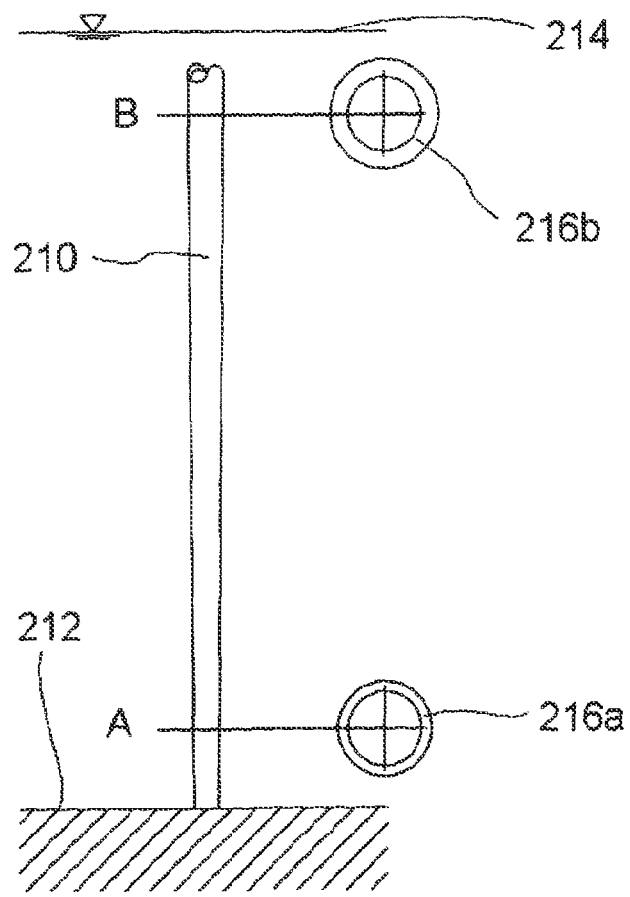
FIG. 10 is a diagrammatic illustration of a pipe used as a vertical riser in accordance with an embodiment of one or more aspects the present invention.

FIG. 10 provides an illustration of a composite pipe according to an embodiment of the present invention, wherein the pipe defines a riser 210 which extends substantially vertically from a seabed 212 towards the sea surface 214. Although not shown, the riser 210 may couple a subsea wellhead or manifold to a floating vessel, for example for the collection of hydrocarbons extracted from a subterranean formation. In use the riser 210 will typically be exposed to varying conditions along its length, particularly in significant water depths. For example, where the riser is supported at its upper end, the tension carried by the riser 210 near the surface 214 will be greater than the tension carried near the seabed 212. Further, the hydrostatic pressure of the sea water acting externally of the riser 210 will increase with depth, as will the internal pressure of the product fluid communicated through the riser. As such, the pressure differential internally and externally of the riser 210 will vary with water depth, and particularly will decrease with depth. Thus, significantly greater mechanical forces, including axial tension, hoop forces and the like will be experienced nearer the surface 214. To accommodate such conditions the composite material forming the pipe wall is varied to provide increased tensile and burst strengths nearer the surface. This is achieved in the embodiment shown in FIG. 10 by varying the composite material to define a varying wall thickness over the length of the pipe 210, while, in the embodiment shown, maintaining a substantially constant inner diameter. Specifically, the thickness of the pipe wall 216a at a lower longitudinal portion of the riser 210, such as at location A, is thinner than the pipe wall 216b at an upper portion of the riser 210, such as at location B. In this way, the present invention permits an optimum design of the riser 210 to be achieved which is optimised or customised for the particular application. This provides significant benefits over prior art pipes which are typically globally engineered in accordance with extreme service conditions, which typically results in a pipe which is significantly over-engineered for most of its length. As such, the present invention may provide suitable pipe products for particular applications while minimising costs, weight, material usage and the like.

Figure 11:
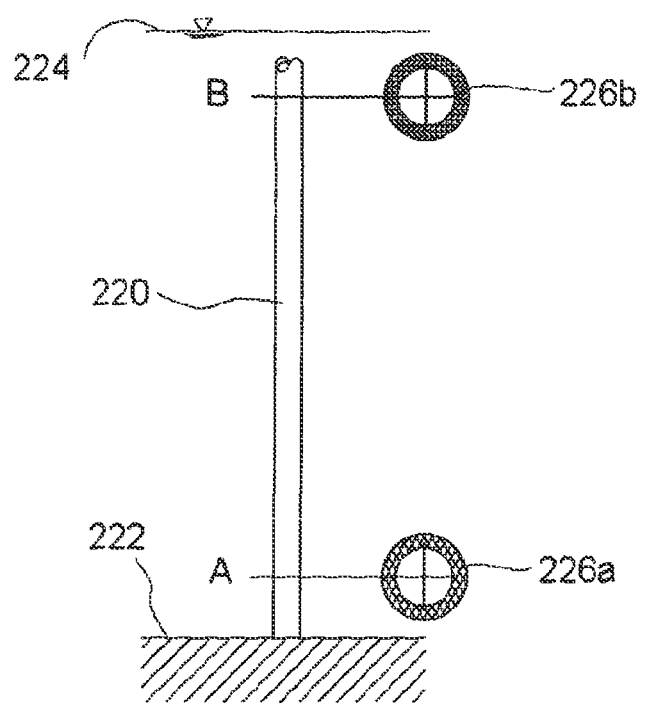
FIG. 11 is a diagrammatic illustration of a pipe used as a vertical rise in accordance with an alternative embodiment of one or more aspects the present invention.

An alternative embodiment is shown in FIG. 11, in which a riser 220, which also extends vertically from the seabed 222 towards the sea surface 224, defines a constant wall thickness along its length, as demonstrated by the sectional illustrations of the pipe wall 226a, 226b taken at lower point A and upper point B. In this embodiment appropriate properties and characteristics of the composite riser 220 providing design optimisation for the particular service condition are provided by a combination of a longitudinal variation in the modulus of the composite material and a longitudinal variation in fibre alignment angle. For example, the composite material within the pipe wall 226b at location B may comprise a higher modulus composite material and a higher combined proportion of near longitudinal fibres (near 0 degree alignment) and near circumferential fibres (near 90 degree alignment) relative to the pipe wall 226a at location A. As such, the increased proportion of near longitudinal fibres may accommodate the increased tensile strength requirements, and the increased proportion of near circumferential fibres may accommodate the increased pressure differential internally and externally of the riser 220.

Figure 12:
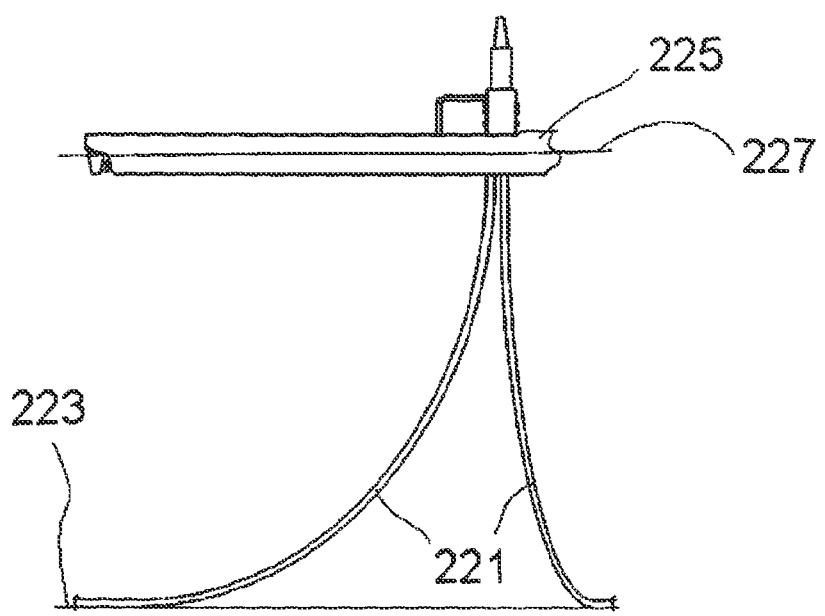
FIG. 12 is a diagrammatic illustration of a pipe used as a catenary type riser in accordance with an embodiment of one or more aspects of the present invention.

It should be noted that the principals of the present invention are not restricted for use in substantially vertical risers as shown in FIGS. 10 and 11. Instead, other riser variations, such as catenary risers may be formed according to the present invention, as illustrated in FIG. 12, in which a plurality (although one may be appropriate) of catenary type risers 221 extend from the seabed 223 to a FPSO vessel 225 floating on the sea surface 227.

Figure 13A:
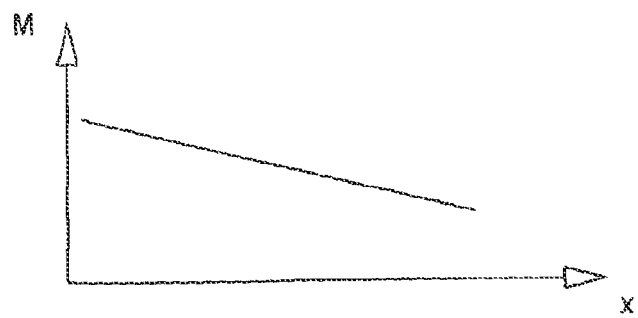
FIGS. 13A and 13B illustrate a variation in bending moment applied to a pipe, and also a pipe embodiment formed according to one or more aspects of the present which accommodates the variation in bending moment.
Figure 13B:
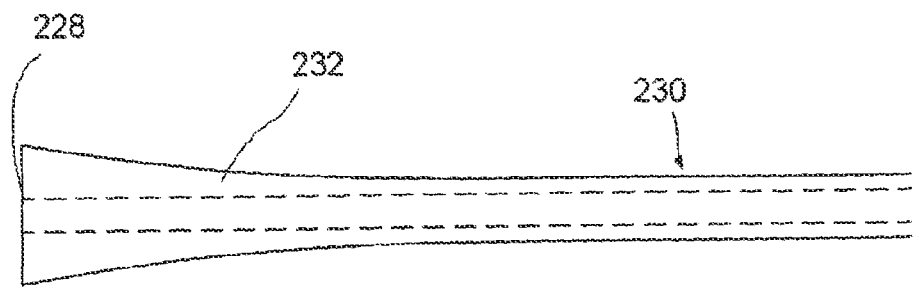

In some embodiments of the invention a composite pipe may be formed which includes a longitudinal portion which is configured to accommodate high bending moments. Such high bending moments may exist in locations where a composite pipe is secured between fixing points which move relative to each other, such as in riser applications where the riser extends between a fixed seabed location and a floating vessel which is subject to motion, such as heave motion, lateral deviations and the like. An exemplary embodiment for accommodating high bending moments is disclosed in FIG. 13, reference to which is now made. Specifically, FIG. 13A provides an exemplary plot of bending moment (M) against pipe length (x) from an end 228 of a pipe 230 which is shown in FIG. 13B, wherein the pipe 230 comprises a pipe wall 232 formed of a composite material. As illustrated, the bending moment is highest at the end 228 of the pipe 230, and reduces along its length. To accommodate such a service condition the pipe wall 232 includes a maximum thickness at the pipe end 228, and reduces thickness along the length of the pipe. In this case the second moment of area, and thus flexural rigidity of the composite pipe wall will be largest at the pipe end 228, and will reduce along the length of the pipe in accordance with the reducing bending moment. In other embodiments the modulus of the composite material and/or the fibre alignment may alternatively, or additionally be modified.

Figure 14:
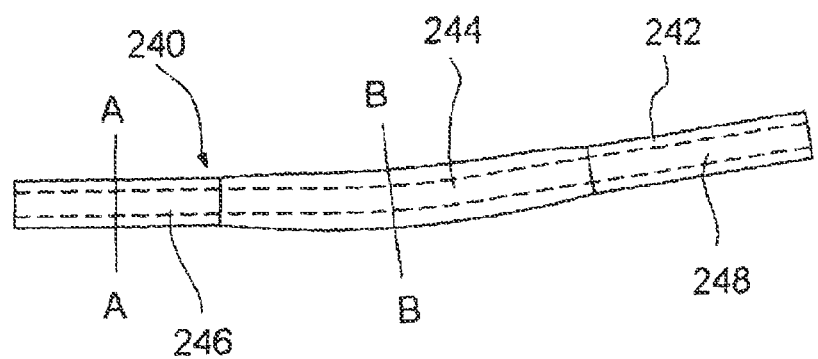
FIG. 14 illustrates a pipe according to a further embodiment of one or more aspects the present invention, wherein the pipe includes a longitudinal portion configured to focus longitudinal bending within said portion.

A further alternative embodiment of the present invention is shown in FIG. 14, reference to which is now made. In this embodiment a pipe 240 which comprises a pipe wall 242 formed of a composite material includes a longitudinal portion 244 which includes a local variation in the construction or make-up of the composite material which focuses or encourages longitudinal bending of the pipe within said longitudinal portion 244. Accordingly, bending within the pipe 240 may be repeatably and controllably restricted to the longitudinal portion 244. This arrangement may permit a hinge effect, for example, to be incorporated into the pipe 240. In some exemplary uses this arrangement may be provided to remove any bending from specific regions of the pipe 240, for example from adjacent regions 246, 248. These adjacent regions 246, 248 may be coupled to a further structure, such that when applied forces encourage longitudinal bending within the pipe 240 bending will be accommodated and restricted substantially entirely within longitudinal portion 244. This may protect any connection or the like between the pipe and another structure.

In the embodiment shown in FIG. 14 the constructional variation in the composite material of the longitudinal portion 244 may be provided in a number of ways. For example, a variation in fibre alignment may be provided between sections A-A and B-B. For example, the variation in fibre alignment in section B-B may be provided to maintain axial and hoop strength within the pipe 240, but reduce axial stiffness to encourage bending.

The pipe 240 shown in FIG. 14 may be advantageously used as part of a pipe bundle, wherein the restricted bending movement to the longitudinal portion 244 may eliminate or substantially minimise interference between individual pipes, permit the pipes to be gathered together in a confined space or the like.

Figure 15:
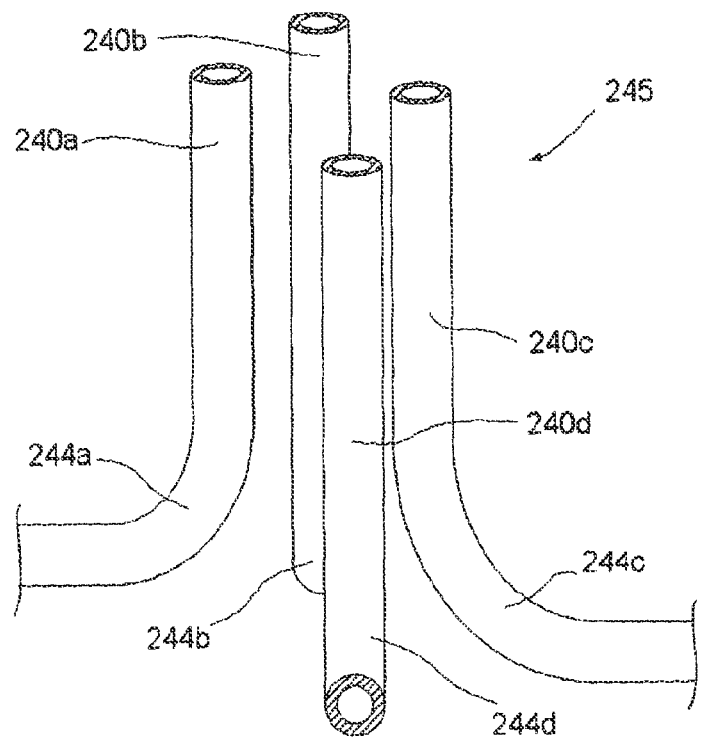
FIG. 15 illustrates an embodiment of a pipe system which includes a plurality of pipes according to one or more aspects of the present invention, wherein the pipes are shown converging on a common location.

For example, a pipe system comprising a plurality of pipes similar to that pipe 240 shown in FIG. 14 is illustrated in FIG. 15. The pipe system, generally identified by reference numeral 245 comprises a plurality of pipes (four in the embodiment shown) 240*a-d* which converge to a single location from varying directions, wherein a respective longitudinal portion 244*a-d* of each pipe 240*a-d* permits converging of the pipes within a minimal area within minimal interference. Such convergence of pipes may occur at a manifold, at a floating vessel or the like.

Figure 16:
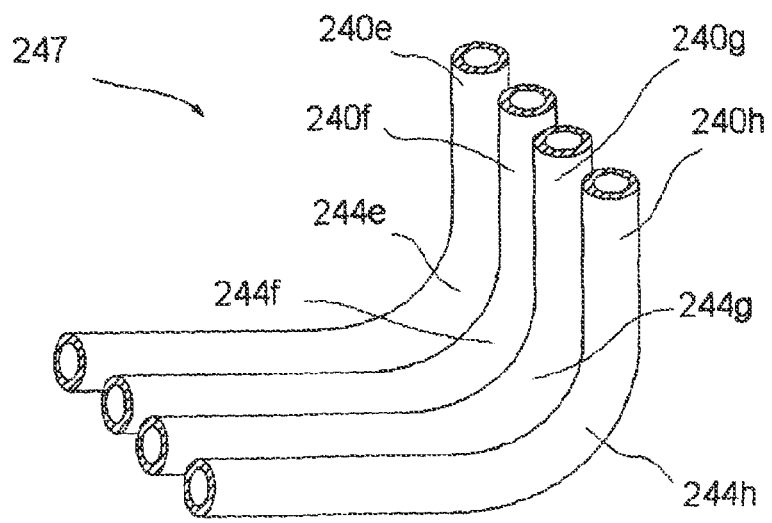
FIG. 16 illustrates an alternative embodiment of a pipe system which includes a plurality of pipes according to one or more aspects of the present invention, wherein the pipes are each shown with a bend focussed at a common location.

Another example is shown in FIG. 16, in which a pipe system 247 comprises a plurality of pipes (four in the embodiment shown) 240*e-h* arranged side-by-side. In this embodiment the respective longitudinal portion 244*e-h* facilitates bending of the pipes 240*e-h* at a common location.

Figure 17A:
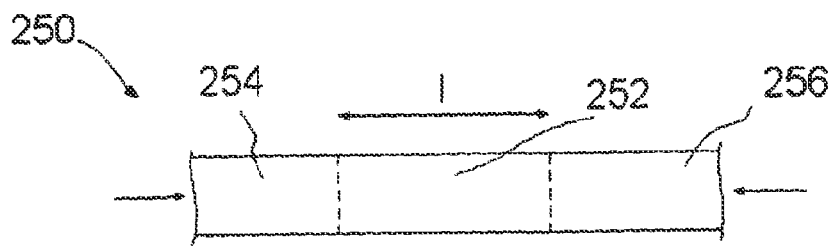
FIGS. 17A and 17B illustrate a pipe according to another embodiment of one or more aspects of the present invention, wherein the pipe includes a longitudinal portion configured to focus longitudinal expansion/contraction within said portion.
Figure 17B:
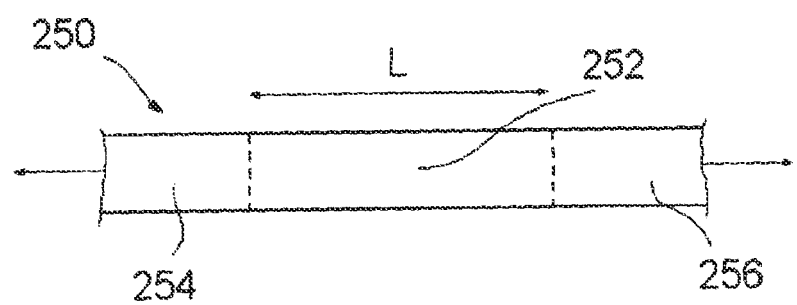

In an alternative, or supplementary embodiment, a longitudinal portion may comprise a local constructional variation in composite material to focus longitudinal expansion and contraction within said longitudinal portion. Such longitudinal expansion and contraction may be a result of mechanical applied forces, thermal expansion/contraction and the like. Such an embodiment is illustrated in FIG. 17, wherein FIG. 17A demonstrates a pipe 250 in a contracted configuration, and FIG. 17B demonstrates the pipe 250 in an expanded configuration. Specifically, a longitudinal portion 252 of the pipe 250 defines a length l when in a contracted state, and an extended length L when in an expanded state. The longitudinal portion 252 includes a local constructional variation in composite material to permit the longitudinal portion 252 to absorb axial extension and contraction in the pipe, such as caused by thermal variations or cycles with minimal lateral deflection or deformation. In this embodiment the longitudinal portion 252 may be provided to remove or reduce any expansion and contraction effects in other longitudinal portions of the pipe, such as adjacent portion 254, 256.

Figure 18:
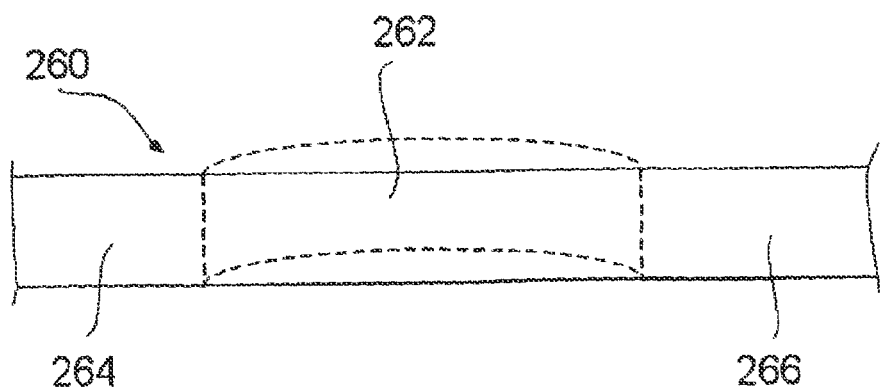
FIG. 18 illustrates a pipe according to a further embodiment of one or more aspects of the present invention, wherein the pipe includes a longitudinal portion configured to focus lateral buckling within said portion.

A further alternative, or supplementary embodiment of a composite pipe is shown in FIG. 18. In this embodiment the pipe, which is generally identified by reference numeral 260, includes a longitudinal portion 262 which comprises or defines a local constructional variation in composite material to focus lateral buckling, deflection or deformation within said longitudinal portion 262, as illustrated in broken outline. This may permit a buckling event, for example by application of a critical buckling load, to be restricted within longitudinal portion 262. A critical buckling load may originate from a service condition of the pipe 260, such as excessive axial thermal expansion or the like. In this present embodiment restricting buckling to the longitudinal portion 262 may assist in protection of other longitudinal portions, such as adjacent portion 264, 266. In the present embodiment the longitudinal portion may comprise a local constructional variation in the composite material to firstly focus buckling at this point, and secondly to accommodate the lateral buckling deformation without resulting in exceeding the yield point of the material. Further, the local constructional variation in the composite material within the longitudinal portion 262 may permit multiple buckling cycles to be accommodated, while minimising effects of material fatigue and the like.

Figure 19:
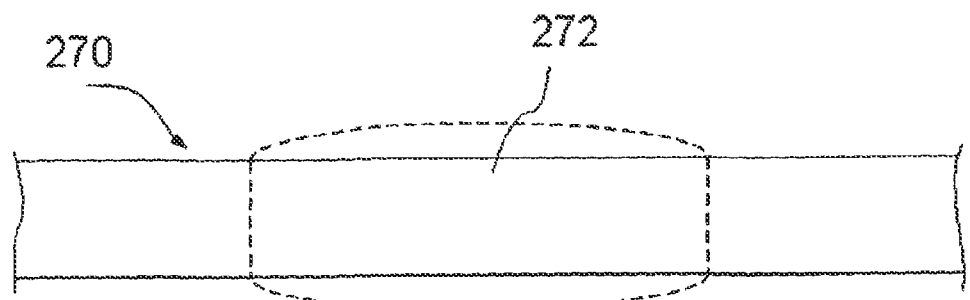
FIG. 19 illustrates a pipe according to a still further embodiment of one or more aspects of the present invention, wherein the pipe includes a longitudinal portion configured to focus radial expansion within said portion.

Another alternative, or supplementary embodiment of a composite pipe is shown in FIG. 19. In this embodiment the pipe, which is generally identified by reference numeral 270, includes a longitudinal portion 272 which comprises or defines a local constructional variation in composite material to focus radial expansion within said longitudinal portion 262, as illustrated in broken outline. Such radial expansion may be caused by internal pressure. This arrangement may be advantageous in absorption of the effects of spikes in internal pressure.

It should be noted that in embodiments of the present invention a local composite constructional variation in a longitudinal portion of a pipe may be provided to encourage a particular behavioural characteristic of the pipe to accommodate or facilitate improved measurements at said longitudinal portion. Such a behavioural characteristic may include bending, axial expansion/contraction, buckling, radial expansion or the like, such as shown in FIGS. 14 to 19. By permitting or encouraging such behaviour, normal pipe movements when in service may be exaggerated within the specified longitudinal portion which may be more appropriate to be monitored by sensing equipment.

Figure 20:
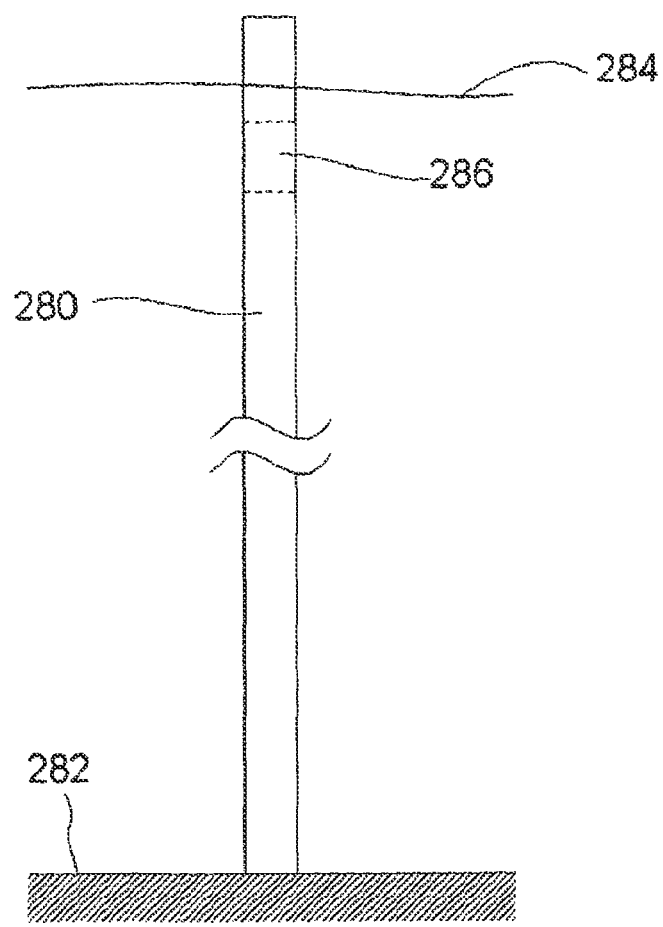
FIG. 20 illustrates a pipe according to a still further embodiment of one or more aspects of the present invention, wherein the pipe includes a longitudinal portion configured to focus tensile failure within said portion.

Another alternative, or supplementary embodiment of the present invention is shown in FIG. 20, reference to which is now made. In this embodiment a composite pipe is provided, in the exemplary form of a riser 280 which extends vertically from a seabed 282 and upwardly of the sea surface 284. The riser 280 includes a longitudinal portion 286 located within an upper region of the riser 280 which includes a local constructional variation in the composite material to establish a region with reduced axial strength. Accordingly, if extreme axial forces are applied to the riser, for example during extreme weather and sea conditions, failure will be encouraged within longitudinal portion 286, which is conveniently placed near the surface 284 to facilitate easier inspection and repair.

Figure 21:
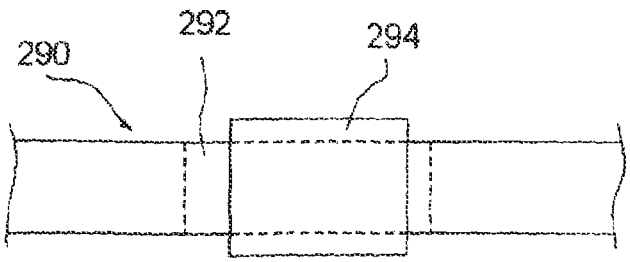
FIG. 21 illustrates a pipe according to another embodiment of one or more aspects of the present invention, wherein the pipe includes a longitudinal portion configured for accommodating a measurement device.

Reference is now made to FIG. 21 in which a diagrammatic illustration of a composite pipe, generally identified by reference 290, in accordance with an alternative, or supplementary embodiment of the present invention is shown. The pipe 290 is formed of a composite material and includes a longitudinal section 292 which comprises or defines a local constructional variation in the composite material which permits acoustic signals to be transmitted through the pipe wall. More specifically, an acoustic apparatus 294 may be positioned on the outer surface of the pipe 290 at the location of the longitudinal portion 292 and operated to transmit and/or receive acoustic signals through the pipe wall. In this arrangement the acoustic signals may be used to determine a property of the pipe 290 and/or a property of a product contained within the pipe, such as a multiphase property, water-cut property, flow property, mass transfer property or the like. The local constructional variation in composite material within the longitudinal portion 292 may permit the acoustic impedance of the pipe wall to more closely match that of, for example, transducers within the acoustic apparatus 294, the product within the pipe 290 or the like. For example, the pipe wall may be configured to function as an efficient transducer coupling arrangement.

In other arrangements the pipe wall may be configured to accommodate or support other types of signal, such as electromagnetic signals or the like.

Figure 22:
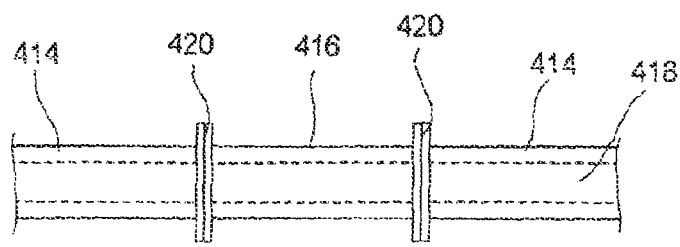
FIG. 22 is a diagrammatic side view of a pipe system in accordance with an embodiment of one or more aspects of the present invention.

FIG. 22 shows a diagrammatic side view of a pipe system in accordance with an embodiment of the present invention. Although not illustrated, the pipe system may be configured for multiple applications, such as for subsea applications. The pipe system comprises two longitudinal steel wall pipe sections 414 and a longitudinal composite wall pipe section 416. The composite pipe section may be provided in accordance with any composite pipe arrangement defined above. The pipe sections 414, 416 are abutted end to end and the composite pipe section 416 is coupled between the steel wall pipe sections 414 so that a contiguous pipe bore 418 is created for the passage of fluid or equipment through the pipe system 410. In the embodiment shown, the pipe sections 414, 416 are coupled by a flange connection 420, although it will be understood that any suitable means for coupling the pipe sections 414, 416 may be used.

The composite pipe section 416 is configured to sustain a greater level of strain than the metal pipe sections 414 when the pipe system is subject to deformation by a load event. This arrangement, in the embodiments shown, functions to focus the deformation of the pipe system substantially entirely within the composite pipe section 416, thus acting to protect the metal pipe sections 414 from excessive strains and/or stresses, material fatigue or the like.

In use, the composite pipe section 416 provides a local variation in a property of the pipe system along the length thereof. The composite pipe section 416 may be configured to provide a local variation in the tensile strength, compressive strength and/or other property of the pipe system in order that the pipe system may absorb axial loads, which may be cyclic axial loads, acting on the pipe system as a result of the environmental and/or operational conditions. The composite pipe section 416 may also be configured to provide a local variation in the second moment of area or other property in order to provide a local variation in the bending stiffness of the pipe system.

In use, the composite pipe section 416 may provide for local expansion, contraction, or bending to absorb the axial loads and reduce or eliminate the occurrence of fatigue, buckling, as may otherwise occur in a pipe system of uniform metal construction. The composite material is configured to focus longitudinal expansion and contraction within the composite pipe section 416, for example from longitudinal expansion and contraction as a result of mechanical applied forces, thermal expansion/contraction and the like.

Figure 23A:
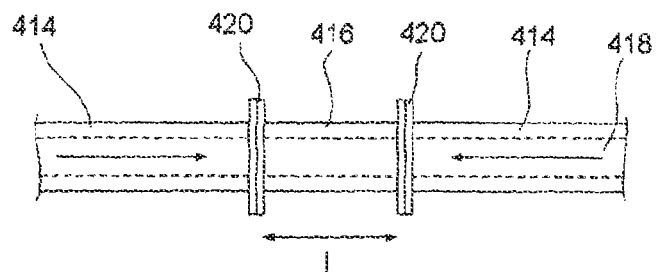
FIGS. 23A and 23B are diagrammatic side views of a pipe system according to an embodiment of one or more aspects of the present invention, wherein the pipe system includes a composite pipe section configured to focus longitudinal expansion/contraction within said composite section.
Figure 23B:
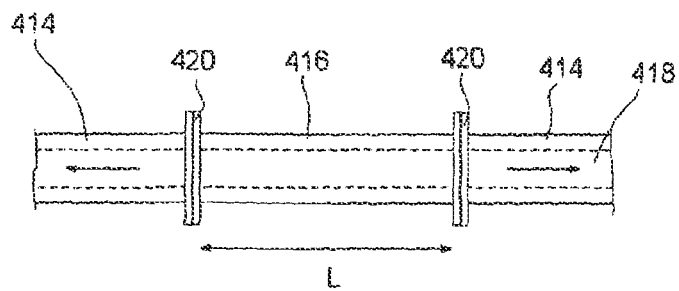

FIG. 23A illustrates a pipe system in a contracted configuration. FIG. 23B illustrates a pipe system in an expanded configuration.

Referring to FIGS. 23A and 23B, a composite pipe section 416 of the pipe system 410 defines a length l when in a contracted state, and an extended length L when in an expanded state. The composite pipe section 416 includes a composite material construction, or a local variation in such construction, to permit the composite pipe section 416 to absorb axial extension and contraction in the pipe, such as caused by thermal variations or cycles with minimal lateral deflection or deformation. In this embodiment, the composite pipe section 416 may be provided to remove or reduce any expansion and contraction effects in other longitudinal portions of the pipe, such as adjacent pipe sections 414.

Figure 24:
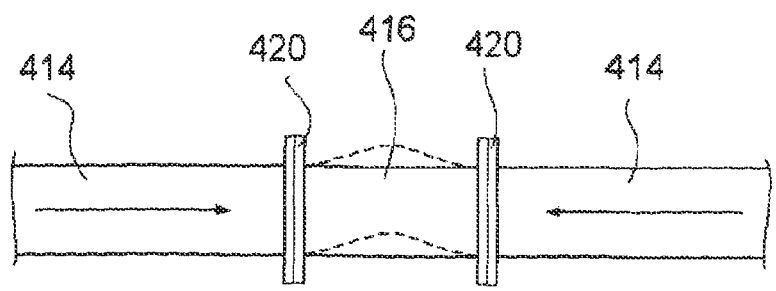
FIG. 24 is a diagrammatic side view of a further embodiment of one or more aspects of the present invention, wherein the pipe system include a composite pipe section configured to focus lateral buckling with said section.

A further alternative, or supplementary embodiment is shown in FIG. 24. In this embodiment the composite pipe section 416 comprises a composite material construction, or local variation in construction, to focus lateral buckling, deflection or deformation within said composite pipe section 416, as illustrated in broken outline. This may permit a bucking event, for example by application of a critical buckling load, to be restricted within composite pipe section 416. A critical buckling load may originate from a service condition of the pipe system, such as axial thermal expansion or the like. In this present embodiment restricting buckling to the composite pipe section 416 may assist in protection of other pipe sections, such as adjacent sections 414.

In this present embodiment restricting buckling to the composite pipe section 416 may assist in protection of other pipe sections, such as adjacent sections 414. Furthermore, by limiting lateral deviation or deformation of the pipe system to the composite pipe section, the effects of a dynamic service condition, such as caused by intermittent operation, multiphase flow or the like is minimised. For example, the composite pipe section 416, by virtue of the composite material, will not be affected by material fatigue issues, and may be able to accommodate increased dynamic operational cycles or the like while maintaining sufficient integrity. Furthermore, restricting deviation or deformation within the pipe system to within the composite pipe section may permit absorption of such movement to be achieved by shorter pipe lengths which may otherwise be required in continuous metal pipe systems.

Thus, in the present embodiment the composite pipe section 416 may comprise a local constructional variation in the composite material to firstly focus buckling at this point, and secondly to accommodate the lateral buckling deformation without resulting in exceeding the yield point of the material. Further, the local constructional variation in the composite material within the composite pipe section 416 may permit multiple buckling cycles to be accommodated, while minimising effects of material fatigue and the like.

Figure 25:
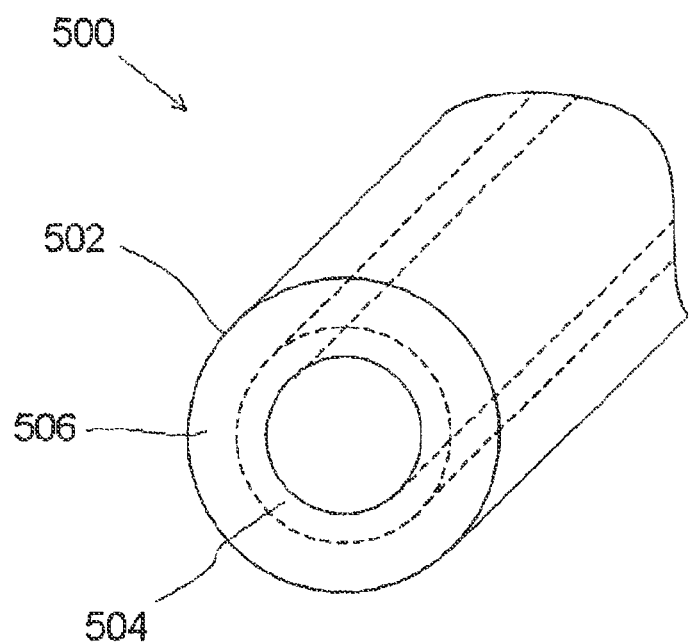
FIG. 25 is a lateral cross-sectional view of a pipe in accordance with an embodiment of one or more aspects the present invention.

A pipe 500 in accordance with an alternative embodiment of the present invention is shown in FIG. 25. In this embodiment the pipe 500 includes a pipe wall 502 comprising a composite material formed of at least a matrix and a plurality of reinforcing fibres embedded within the matrix. The matrix extends continuously through the pipe wall 502. A radially inner region 504 of the pipe wall 502 is of uniform construction. An outer region 506 of the pipe wall 502 is of varying construction. That is, different sections or portions, such as different longitudinal portions, circumferential portions or the like of the outer region 506 may vary in construction. The constructional variation may be provided by any method or arrangement described above in other embodiments.

It should be understood that the embodiments described herein are merely exemplary, and that various modifications may be made thereto without departing from the scope of the invention. For example, a pipe may be provided which has a one or multiple longitudinal portions which include one or more constructional variations in the composite material to prove a number of desired behavioural characteristics. Further, although round pipes are shown this is not essential, and other cross-sectional shapes may be possible, such as oval, rectilinear or the like. Further, features of one or more embodiments illustrated above may be provided alone or in combination with the features of any other embodiment. For example, a pipe may be provided which as one or more circumferential variations, in addition to one or more longitudinal variations.

The invention claimed is:

1. A subsea composite pipe for the conveyance of fluid, the composite pipe comprising:
a pipe wall comprising:
a composite material formed of at least a thermoplastic matrix and a plurality of reinforcing fibers embedded within the matrix,
a local variation in construction of at least one longitudinal section of the pipe wall to establish a variation in a constructional property of the composite pipe along its length,
the local variation in construction includes a first fiber construction in a first longitudinal section of the pipe wall, the first fiber construction is different from a second fiber construction of the composite material in a second longitudinal section of the pipe wall and the first fiber construction in the first longitudinal section provides the variation in the constructional property in the first longitudinal section for a service condition at the first longitudinal section, and
the first longitudinal section and the second longitudinal section of the pipe wall are circular in cross section and define a constant inner diameter;
the local variation in construction between the first and second longitudinal sections is located at a common radial location within the pipe wall.

2. The pipe according to claim 1, wherein the local constructional variation is selected to optimized the pipe along its length for an anticipated service condition.

3. The pipe according to claim 1, wherein the local constructional variation in at least one longitudinal section establishes a characteristic in the pipe including at least one of a mechanical characteristic and a thermal characteristic.

4. The pipe according to claim 1, wherein the local constructional variation creates a deformation characteristic at said longitudinal section during an anticipated service condition, wherein said deformation characteristic comprises at least one of buckling, lateral deformation, longitudinal expansion and contraction, radial expansion and contraction, torsional deformation, bending and catastrophic failure including one or both of axial tensile failure and hoop tensile failure.

5. The pipe according to claim 1, wherein at least one longitudinal section comprises a local variation in at least one of modulus of elasticity, second moment of area, coefficient of thermal expansion, thermal conductivity, a material strength, tensile strength, hoop strength, compressive strength, flexural strength and geometry.

6. The pipe according to claim 1, wherein the local constructional variation in at least one longitudinal section of the pipe wall defines a discrete constructional variation with respect to an adjacent longitudinal section.

7. The pipe according to claim 1, wherein the local variation in at least one longitudinal section of the pipe wall comprises a tapered or gradual variation with respect to an adjacent region.

8. The pipe according to claim 1, wherein at least one longitudinal section comprise a local constructional variation in the matrix material of the composite material.

9. The pipe according to claim 1, wherein at least one longitudinal section comprises a local variation in the type of matrix material.

10. The pipe according to claim 1, wherein at least one longitudinal section comprises a local variation in the distribution density of the reinforcing fibers within the matrix material.

11. The pipe according to claim 1, wherein at least one longitudinal section comprises a local variation in the type of fiber within the composite material.

12. The pipe according to claim 11, wherein one longitudinal section of the pipe wall comprises a fiber type which is not present in another longitudinal section, or at least present in a different quantity, composition or configuration.

13. The pipe according to claim 1, wherein at least one longitudinal section comprises one or more fibers with a modified mechanical property, including at least one of stiffness and tensile strength.

14. The pipe according to claim 1, wherein at least one longitudinal section comprises a local variation in fiber alignment angle within the composite material such that one or more reinforcing fibers in one longitudinal section defines a different alignment angle to one or more reinforcing fibers in a different longitudinal section.

15. The pipe according to claim 1, wherein one longitudinal section comprises a different proportion or quantity of fibers which define substantially the same alignment angle as those in another longitudinal section.

16. The pipe according to claim 1, wherein at least one longitudinal section of the pipe wall comprises a local variation in fiber pre-stress such that the fiber pre-stress in one longitudinal portion of the pipe wall differs from that in a different longitudinal section.

17. The pipe according to claim 1, wherein at least one longitudinal section of the pipe wall comprises a local variation in construction by use of at least one insert.

18. The pipe according to claim 1, wherein the local constructional variation in at least one longitudinal section is selected to provide a desired longitudinal bending characteristic along the pipe.

19. The pipe according to claim 1, wherein the local constructional variation in at least one longitudinal section is selected to provide a desired thermal expansion characteristic of the pipe.

20. The pipe according to claim 1, wherein the local constructional variation in at least one longitudinal section is selected to accommodate or absorb an anticipated movement or deformation within the pipe.

21. The pipe according to claim 20, wherein the anticipated movement or deformation of the pipe comprises at least one of longitudinal expansion or contraction, lateral movement or deformation and radial expansion or contraction.

22. The pipe according to claim 1, wherein the local constructional variation in at least one longitudinal section is selected to provide a desired energy absorption characteristic of the pipe.

23. The pipe according to claim 1, wherein the local constructional variation in at least one longitudinal section is selected to provide a desired acoustic characteristic of the pipe.

24. The pipe according to claim 23, wherein the local variation is selected to permit the pipe to transmit acoustic energy at the associated longitudinal section.

25. The pipe according to claim 1, wherein the local constructional variation in at least one longitudinal section is selected to provide a desired resonant characteristic of the pipe.

26. The pipe according to claim 1, comprising a measuring device located at one longitudinal section of the pipe wall which comprises a local constructional variation, wherein the local constructional variation facilitates improved measurement.

27. The pipe according to claim 26, wherein the local constructional variation is selected to permit focusing or exaggeration of movement in the longitudinal section associated with the measuring device.

28. The pipe according to claim 1, wherein at least one circumferential segment of the pipe wall comprises or defines a local variation in construction to provide a local variation in a property of the pipe.

29. The pipe according to claim 1, wherein the matrix defines a continuous structure and the fibers are variably distributed within the continuous matrix structure.

30. The pipe according to claim 29, wherein the distribution of the reinforcing fibers varies throughout the continuous matrix in a radial direction through the pipe wall.

31. The pipe according to claim 30, wherein the distribution of the reinforcing fibers varies from zero at the region of an inner surface of the pipe wall, and is increased in a direction towards the outer wall.

32. The pipe according to claim 1, wherein continuous reinforcing fibers extend between different longitudinal sections of the pipe wall, and a variation is provided along the length of the continuous fibers to establish a constructional variation between different longitudinal sections of the pipe wall.

33. The pipe according to claim 1, wherein a radially inner region of the pipe wall defines a uniform construction along its length, and a radially outer region of the pipe wall defines a varying construction between different longitudinal sections.

34. The pipe according to claim 33, wherein the inner region of the pipe wall is defined by a pre-formed pipe structure or mandrel of uniform construction along its length, and the outer region of the pipe wall is defined by being formed on the pre-formed mandrel, while including a variation in construction between two different longitudinal regions.

35. A method for manufacturing a subsea pipe for the conveyance of fluid, comprising:
    forming a pipe wall with a composite material formed of at least a thermoplastic matrix and a plurality of reinforcing fibers embedded within the matrix; and
    varying the fiber construction of the composite material in at least one longitudinal section of the pipe wall such that the fiber construction in a first longitudinal section differs from the fiber construction in a different second longitudinal section to establish a variation in a property of the pipe along its length, wherein the fiber construction in the first longitudinal section provides the variation in the constructional property in the first longitudinal section for a service condition at the first longitudinal section; and
    configuring the pipe wall such that the first and second longitudinal sections of the pipe wall are circular in cross section; and
    configuring the pipe wall such that the first and second longitudinal sections of the pipe wall define a constant inner diameter;
    configuring the variation in the fiber construction between the first and second longitudinal sections such that the variation is located at a common radial location within the pipe wall.

36. The pipe according to claim 1, wherein the matrix defines a continuous structure extending through the entire pipe wall in a radial direction.

* * * * *